US009934248B2

(12) United States Patent
Ukai

(10) Patent No.: US 9,934,248 B2
(45) Date of Patent: Apr. 3, 2018

(54) COMPUTER SYSTEM AND DATA MANAGEMENT METHOD

(71) Applicant: HITACHI, LTD., Tokyo (JP)

(72) Inventor: Toshiyuki Ukai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 14/770,659

(22) PCT Filed: Dec. 25, 2013

(86) PCT No.: PCT/JP2013/084631
§ 371 (c)(1),
(2) Date: Aug. 26, 2015

(87) PCT Pub. No.: WO2015/097774
PCT Pub. Date: Jul. 2, 2015

(65) Prior Publication Data
US 2016/0012075 A1 Jan. 14, 2016

(51) Int. Cl.
*G06F 17/30* (2006.01)
(52) U.S. Cl.
CPC .. *G06F 17/30203* (2013.01); *G06F 17/30091* (2013.01); *G06F 17/30106* (2013.01); *G06F 17/30132* (2013.01); *G06F 17/30194* (2013.01)
(58) Field of Classification Search
CPC ......... G06F 17/30203; G06F 17/30091; G06F 17/30106; G06F 17/30132; G06F 17/30194
See application file for complete search history.

(56) References Cited

U.S. PATENT DOCUMENTS

| | | | |
|---|---|---|---|
| 8,676,951 B2* | 3/2014 | Shiga | G06F 17/3033 709/223 |
| 9,262,500 B2* | 2/2016 | Kinoshita | G06F 17/30587 |
| 9,323,457 B2* | 4/2016 | Blott | G06F 3/0604 |
| 9,361,408 B2* | 6/2016 | Marukame | G06F 17/30982 |
| 2011/0225215 A1 | 9/2011 | Ukai et al. | |
| 2012/0036317 A1 | 2/2012 | Torii | |
| 2013/0325915 A1 | 12/2013 | Ukai | |

(Continued)

FOREIGN PATENT DOCUMENTS

| | | |
|---|---|---|
| JP | 2010-198258 A | 9/2010 |
| JP | 2011-191835 A | 9/2011 |

(Continued)

*Primary Examiner* — Jeff A Burke
(74) *Attorney, Agent, or Firm* — Volpe and Koenig, P.C.

(57) ABSTRACT

A computer system comprising computers, each the computers is coupled to a storage apparatus storing at least one file including records, each the computers includes a file system, a key-value data management module, and a loader, each the computers holds key-value data structure information, the loader being configured to identify a file to be processed in which the at least one piece of the updated key-value data is to be reflected; and transmit a request to update the file including the at least one piece of the updated key-value data; and the file system being configured to identify the position of one of the records corresponding to the piece of updated key-value data within the file based on the key-value data structure information, and update the file by writing the at least one piece of the updated key-value data.

12 Claims, 18 Drawing Sheets

(56) References Cited

U.S. PATENT DOCUMENTS

| | | | |
|---|---|---|---|
| 2013/0332608 A1* | 12/2013 | Shiga | G06F 9/5088 709/226 |
| 2015/0127658 A1* | 5/2015 | Ding | G06F 17/30336 707/747 |
| 2015/0244558 A1* | 8/2015 | Tully | H04L 29/08882 709/201 |

FOREIGN PATENT DOCUMENTS

| | | |
|---|---|---|
| JP | 2013-004067 A | 1/2013 |
| JP | 2013-088920 A | 5/2013 |
| WO | 2010/114006 A1 | 10/2010 |
| WO | 2012/114531 A1 | 8/2012 |

* cited by examiner

FILE 181

| FIELD 211 | FIELD 212 | FIELD 213 | | |
|---|---|---|---|---|
| ACCOUNT NUMBER A | BRANCH NUMBER X | PRODUCT CODE aaa | ... | RECORD 201 |
| ACCOUNT NUMBER B | BRANCH NUMBER Y | PRODUCT CODE bbb | ... | RECORD 202 |
| ACCOUNT NUMBER C | BRANCH NUMBER Y | PRODUCT CODE aaa | ... | RECORD 203 |
| ACCOUNT NUMBER A | BRANCH NUMBER Z | PRODUCT CODE bbb | ... | RECORD 204 |
| ⋮ | ⋮ | ⋮ | ... | |

FIG. 2

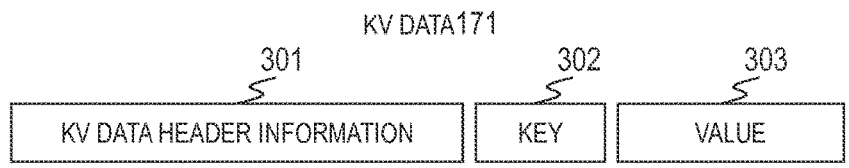

FIG. 3

```
                    ┌─ 132
                  FILE MANAGEMENT INFORMATION
                  ├─ FILE ID                              401
                  ├─ PERMISSION                           402
                  ├─ OWNER                                403
                  ├─ SIZE                                 404
                  ├─ TIME STAMP                           405
                  ├─ POINTER TO                           406
                  │  RECORD DEFINITION INFORMATION
                  ├─ STORAGE LOCATION INFORMATION         407
                  ⋮
```

FIG. 4

```
                                          ┌─ 601
IDENTIFICATION    DIVISION.
PROGRAM-ID.       PROGRAM01.
ENVIRONMENT       DIVISION.
INPUT-OUTPUT      SECTION.
FILE-CONTROL.
   SELECT F01 ASSIGN TO "FILE NAME".
DATA              DIVISION.
FILE              SECTION.
FD F01.
01 F01R.
   03 F01-ACCT    PIC 9(08).  ⎫
   03             PIC X(01).   ⎬─ 602
   03 F01-SHP     PIC 9(04).   ⎪
   03             PIC X(01).   ⎪
   03 F01-CODE    PIC 9(08).  ⎭
WORKING-STORAGE   SECTION.
                       ⋮
```

FIG. 6

FILE ARRANGEMENT INFORMATION 152

| CACHE AREA ID (801) | FILE ID (802) | POINTER TO KV DATA STRUCTURE INFORMATION (803) |
|---|---|---|
| 1 | /file1 | ... |
| 2 | /dir1/file2 | ... |
| 3 | /dir2/file3 | ... |
| ⋮ | ⋮ | ⋮ |

FIG. 8

KV DATA STRUCTURE INFORMATION 153

| ID (901) | KEY (902) | VALUE SIZE (903) | OFFSET (904) |
|---|---|---|---|
| 1 | 001 | xxx | yyy |
| 2 | 502 | xxy | yyz |
| 3 | 304 | xyy | yzz |
| ⋮ | ⋮ | ⋮ | ⋮ |

FIG. 9

TEMPORARY LIST 2200

| SUB FILE ID | DISTRIBUTED KVS SERVER ID | RECORDID | IN-CHARGE FLAG |
|---|---|---|---|
| SUBFILE1 | SERVERA | RECORD1 | 1 |
| | | ⋮ | ⋮ |
| | | RECORD16 | 0 |
| | | ⋮ | ⋮ |
| SUBFILE2 | SERVERB | RECORD16 | 1 |
| | | ⋮ | ⋮ |
| ⋮ | ⋮ | ⋮ | ⋮ |

FIG. 22

COMPUTER SYSTEM AND DATA MANAGEMENT METHOD

BACKGROUND OF THE INVENTION

This invention relates to a computer system to which a distributed KVS is applied.

In recent years, there has been an explosive increase in data amount to be processed by application programs in computer systems. There is known a distributed memory caching technology as a technology for speedily processing a large amount of data by using a large number of servers (see, for example, JP 2011-191835 A). The distributed memory caching technology is a technology for integrating memories of a plurality of servers to build a memory space (memory store) for storing a large amount of data. With this, it is possible to realize parallelization of processing through division arrangement of data to a plurality of servers and a speedup of input/output by storing the data in the integrated memory.

In the distributed memory caching technology, a distributed key-value store (distributed KVS) for handling data having a key-value data format is employed in order to distribute the large amount of data among the plurality of servers. Key-value data has a data structure in which a key serving as an identifier of data and a value serving as a body of the data are associated with each other, and is managed by a combination of [key, value].

For example, in a case where the distributed KVS is employed for a file formed of a plurality of records, a piece of key-value data is generated from one record, and a plurality of pieces of key-value data are divided and arranged on the plurality of servers based on a range of a key (key range). An application running on each server processes the divided and arranged a plurality of pieces of key-value data in parallel, to thereby be able to realize a speedup of processing.

JP 2011-191835 A includes the description "The management computer manages fragmentation definition information indicating a manner of allocation of data of the file and file management information for managing the state of allocation of the data of the file, and allocates the data of the file stored in the storage device to a distributed memory storage in accordance with the fragmentation definition information. The application computers executes an application program and an access management program. The application computers, by executing the access management program, receives an access to data of the file from the application program, obtains the file management information about the file to be accessed from the management program, and accesses the data allocated to the distributed memory storage on the basis of the file management information."

SUMMARY OF THE INVENTION

It is conceivable to use the key-value data as a cache in order to speed up processing for a file (data source). However, there is a problem in that cooperation is weak between the file system or the like for managing the file corresponding to the source data of the key-value data and a distributed KVS management module or the like for managing the key-value data.

In the distributed KVS, information such as a record structure or the like of the file is lost when the key-value data is generated, and hence the key-value data cannot be reflected in the file as it is. Therefore, in the distributed KVS, a storage apparatus is used as a cache for the memory store or a storage area for storing a copy of data for the purpose of redundancy, and hence the key-value data is stored in the storage apparatus as it is.

In other words, in the related art, the key-value data and the data source are not managed in association with each other, and hence such a mechanism as to reflect an update made to the key-value data in the data source is not provided.

Further, a storage location of the key-value data and a storage location of the file is not associated with each other, which raises a problem in that a communication load between servers increases in a case where the distributed KVS is employed for a distributed file managed by a distributed file system. More specifically, in a case where the key-value data is generated from the distributed file arranged on a plurality of servers, or in a case where the key-value data is reflected in the distributed file, each of the plurality of servers needs to conduct communications frequently in order to grasp the arrangement of the key-value data or the arrangement of the distributed file, which leads to a problem in that the communication load between the servers increases.

This invention has been made in view of the above-mentioned problems. This invention provides a mechanism for managing a data source in key-value data in association with each other, to thereby reflect the updated key-value data in the data source. In other words, this invention provides a mechanism capable of accessing data having the same contents through any one of a file I/O API and a key-value data API. Further, this invention provides a mechanism for suppressing a communication load between servers in a case where a distributed KVS is employed for a distributed file by managing the data source and the key-value data in association with each other.

The present invention can be appreciated by the description which follows in conjunction with the following figures, wherein: a computer system, comprises a plurality of computers coupled to one another through a network. Each of the plurality of computers includes a processor, a memory coupled to the processor, and a network interface coupled to the processor. The each of the plurality of computers is coupled to a storage apparatus configured to store at least one file including a plurality of records. The each of the plurality of computers further includes: a file system configured to manage the at least one file stored in the storage apparatus; a key-value data management module configured to generate at least one data storage area by integrating storage areas included in the plurality of computers, and manage key-value data arranged in the at least one data storage area; and a loader configured to generate a plurality of pieces of the key-value data by dividing the at least one file and associating a search key and a value indicating a content of one of the plurality of records in association with each other, and distributively store the plurality of pieces of the generated key-value data in the at least one data storage area. The each of the plurality of computers is configured to hold, for each the plurality of pieces of the key-value data, key-value data structure information in which the search key, a size of the value, and a position of one of the plurality of records corresponding to a piece of the key-value data within the at least one file are associated with one another. The loader is configured to transmit a read request for obtaining at least one piece of the updated key-value data to the key-value data management module of each of the plurality of computers, in a case of receiving a persistence instruction to instruct the loader to reflect the at least one piece of the updated key-value data in the at least one file;

the key-value data management module is configured to: retrieve the at least one piece of the updated key-value data from among the plurality of pieces of the key-value data stored in the storage areas forming the at least one data storage area in a case of receiving the read request; and transmit the at least one piece of the updated key-value data to the loader that has transmitted the read request. The loader is configured to: identify a file to be processed in which the at least one piece of the updated key-value data is to be reflected based on the at least one piece of the updated key-value data obtained from the key-value data management module of the each of the plurality of computers; identify one of the plurality of computers coupled to the storage apparatus that stores the file to be processed; and transmit a request to update the file including the at least one piece of the updated key-value data to the identified one of the plurality of computers. And the file system is configured to: identify the position of one of the plurality of records corresponding to the piece of updated key-value data within the file based on the key-value data structure information in a case of receiving the request to update the file; and update the file by writing the at least one piece of the updated key-value data in the identified position of the file.

According to the one embodiment of this invention, the key-value data management module can manage the file and the key-value data in association with each other based on the key-value data structure information, and can reflect the updated key-value data in the file. Accordingly, it is possible to access data having the same contents through any one of the file I/O API and the key-value data API.

Objects, configurations, and effects other than those described above become apparent from the following descriptions of embodiments of this invention.

BRIEF DESCRIPTION OF THE DRAWINGS

FIG. 2 is an explanatory diagram for showing a structural example of a file according to the first embodiment of this invention, FIG. 3 is an explanatory diagram for showing a structural example of KV data according to the first embodiment of this invention, FIG. 4 is an explanatory diagram for showing an example of file management information according to the first embodiment of this invention;

FIG. 6 is an explanatory diagram for illustrating an example of a source program of a user application program (UAP) according to the first embodiment of this invention, FIG. 8 is an explanatory diagram for showing an example of file arrangement information according to the first embodiment of this invention, FIG. 9 is an explanatory diagram for showing an example of KV data structure information according to the first embodiment of this invention, FIG. 22 is an explanatory diagram for showing an example of a temporary list according to the second embodiment of this invention.

DETAILED DESCRIPTION OF THE PREFERRED EMBODIMENTS

Figure 1:
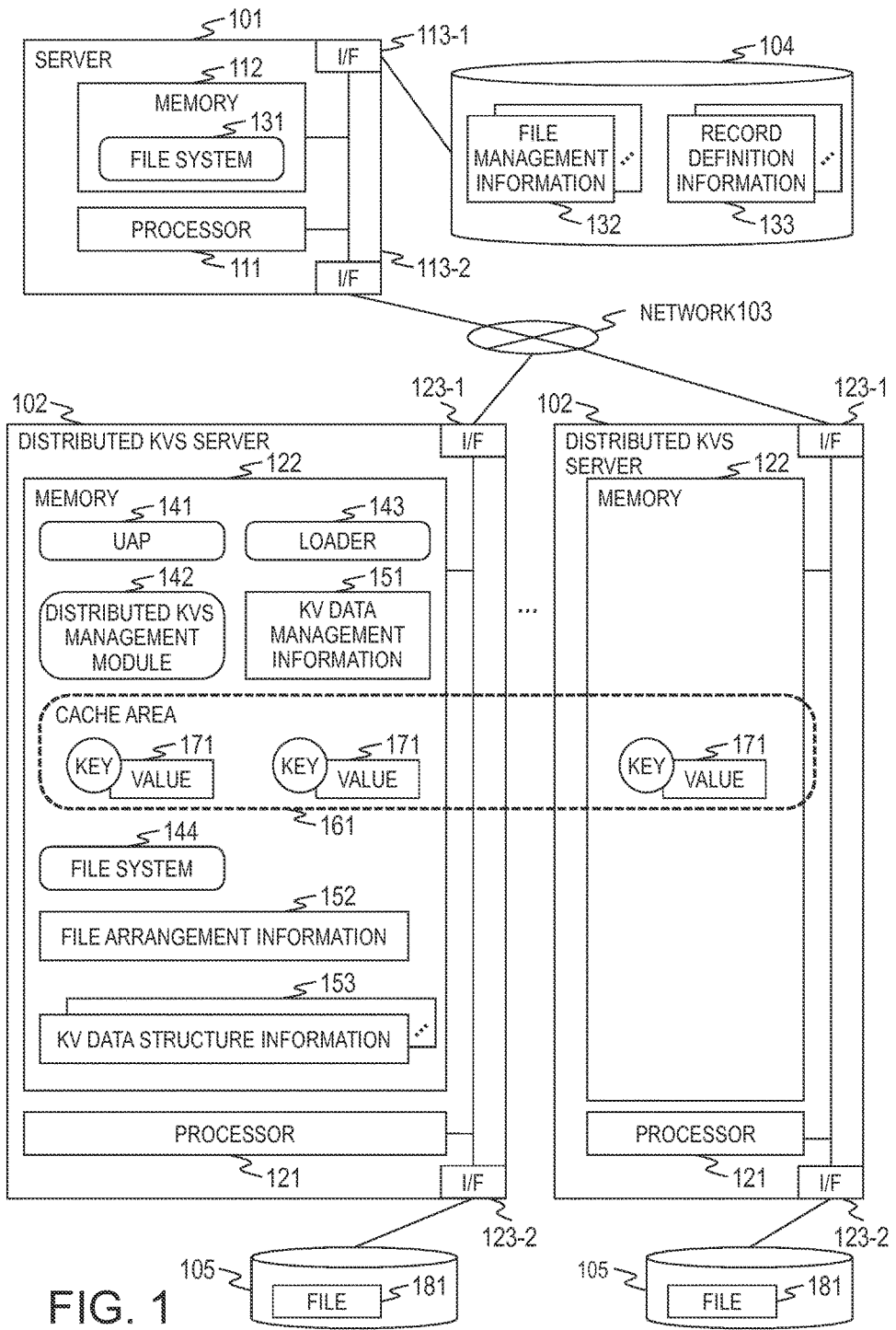
FIG. 1 is a block diagram for illustrating a configuration example of a computer system according to a first embodiment of this invention.

Now, embodiments of this invention are described in detail referring to the drawings.

First Embodiment

FIG. 1 is a block diagram for illustrating a configuration example of a computer system according to a first embodiment of this invention.

The computer system according to the first embodiment includes a server 101, a plurality of distributed KVS servers 102, a storage apparatus 104, and a plurality of storage apparatus 105.

The server 101 is coupled to each of the plurality of distributed KVS servers 102 through a network 103. A LAN, a WAN, and the like are conceivable as the network 103, but this invention is not limited to a specific type of the network 103.

The distributed KVS server 102 is a computer organizing a key-value store (KVS). Each of the distributed KVS servers 102 is coupled to one of the storage apparatus 105 storing a data source (file 181). Examples conceivable as the storage apparatus 105 include a storage system including a plurality of non-volatile storage media such as HDDs, a solid state disk apparatus using a flash memory as a storage medium, and an optical disc drive.

In the following description, the expression "file 181 managed by the distributed KVS server 102" represents the file 181 stored in the storage apparatus 105 coupled to the distributed KVS server 102. Further, the expression "distributed KVS server 102 that manages the file 181" represents the distributed KVS server 102 coupled to the storage apparatus 105 that stores the file 181.

In this embodiment, storage areas respectively included in the plurality of distributed KVS servers 102 are integrated, to thereby generate at least one cache area 161. The cache area 161 stores key-value data 171 generated from the file 181. In the following description, the key-value data 171 is referred to also as "KV data 171".

Now, a relationship between the file 181 and the KV data 171 is described.

FIG. 2 is an explanatory diagram for showing a structural example of the file 181 according to the first embodiment of this invention. FIG. 3 is an explanatory diagram for showing a structural example of the KV data 171 according to the first embodiment of this invention.

The file 181 is formed of a plurality of records serving as basic units of data processed by an application such as a user application program (UAP) 141. In the example shown in FIG. 2, the file 181 includes a record 201, a record 202, a record 203, and a record 204.

Each of the record 201, the record 202, the record 203, and the record 204 is formed of a plurality of fields. The field stores various kinds of information such as a numerical value and a character. In the example shown in FIG. 2, each record includes a field 211, a field 212, and a field 213.

In general, within a range of constraint of a system, one file can include an arbitrary number of records, and one record can include an arbitrary number of fields. For example, in a case of data used in a product transaction job, a record is formed of transaction information on one transaction, and individual pieces of information (data) such as an account number, a branch number, and a product code are recorded in the fields.

On the other hand, the KV data 171 is formed of KV data header information 301, a key 302, and a value 303.

The KV data header information 301 represents information indicating a structure of a piece of KV data and a relationship with another piece of KV data generated from the same file. The KV data header information 301 is described in detail with reference to FIG. 9. The key 302 represents information to be a search key. The value 303 represents a data body of the KV data.

The UAP 141 executes predetermined processing by using the file 181 or the KV data 171. In this embodiment, the file 181 is divided in units of records, and a piece of KV data having an arbitrary field as a key and the record body as a value is generated from one record. The description returns to FIG. 1.

The cache area 161 is accessible to the distributed KVS server 102 as well as to a shared device. Further, the data of the file 181 divided in units of records, that is, the KV data 171 is arranged on the plurality of distributed KVS servers 102. Each UAP 141 executes processing by using the KV data 171 arranged on the distributed KVS server 102 on which the UAP 141 itself is running.

As described above, each of a plurality of UAPs 141 processes a plurality of pieces of KV data 171 in parallel, to thereby be able to reduce an amount of data processed by the single UAP 141. Accordingly, it is possible to speed up the processing.

Further, this embodiment is described by taking the file 181 as an example of the data source to be processed, but this invention is not limited thereto, and any storage format of data may be used.

The server 101 includes a processor 111, a memory 112, an interface (I/F) 113-1, and an interface 113-2. The server 101 is coupled to the storage apparatus 104 through the interface 113-1, and is coupled to the plurality of distributed KVS servers 102 through the interface 113-2.

The processor 111 executes a program stored in the memory 112. The processor 111 executes the program stored in the memory 112, to thereby realize a function of the server 101.

The memory 112 stores a program to be executed by the processor 111 and data necessary to execute the program. The memory 112, conceivable examples of which include a semiconductor memory such as a DRAM, is accessible with higher speed than the storage apparatus 104.

The memory 112 according to this embodiment stores a program for realizing a file system 131. The file system 131 manages data in units of files. The file system 131 according to this embodiment centrally manages the files 181 stored in the storage apparatus 105 coupled to the respective distributed KVS servers 102.

The storage apparatus 104 stores various kinds of information. Examples conceivable as the storage apparatus 104 include a storage system including a plurality of storage media such as HDDs, a solid state disk apparatus using a flash memory as a storage medium, and an optical disc drive. The storage apparatus 104 according to this embodiment stores a plurality of pieces of file management information 132 and a plurality of pieces of record definition information 133.

The file management information 132 stores management information such as metadata of the file 181. One piece of file management information 132 exists in association with one file 181. The record definition information 133 stores management information on the records forming the file 181. The record definition information 133 is managed in association with one piece of file management information 132. The file management information 132 and the record definition information 133 are described later in detail with reference to FIG. 4, FIG. 5, and FIG. 6.

The distributed KVS server 102 includes a processor 121, a memory 122, an interface (I/F) 123-1, and an interface 123-2. The distributed KVS server 102 is coupled to the server 101 and other distributed KVS servers 102 through the interface 123-1. Further, the distributed KVS server 102 is coupled to the storage apparatus 105 through the interface 123-2.

This embodiment is described on the assumption that the respective distributed KVS servers 102 have the same configuration, but the respective distributed KVS servers 102 do not necessarily have the same configuration as long as functions and processing described below can be realized.

The processor 121 executes the program stored in the memory 122. The processor 121 executes the program stored in the memory 122, to thereby realize a function of the distributed KVS server 102 described later.

The memory 122 stores a program to be executed by the processor 121 and data necessary to execute the program. The memory 122, conceivable examples of which include a semiconductor memory such as a DRAM, is accessible with higher speed than the storage apparatus 105.

The memory 122 according to this embodiment stores a program for realizing the UAP 141, and a program for realizing a distributed KVS management module 142, a loader 143, and a file system 144. Further, the memory 122 stores KV data management information 151, file arrangement information 152, and KV data structure information 153.

The UAP 141 executes various kinds of processing. The file system 144 is the same as the file system 131. The distributed KVS management module 142 manages the cache area 161 in cooperation with the distributed KVS management module 142 of another distributed KVS server 102. Further, the distributed KVS management module 142 controls access to the cache area 161. The loader 143 generates the KV data 171 from the file 181 stored in the storage apparatus 105 and distributively arranges the KV data 171 in the cache area 161, while storing the KV data 171 stored in the cache area 161 in the storage apparatus 105.

In the following description, processing for distributively arranging the file 181 stored in the storage apparatus 105 in the cache area 161 is referred to as "loading processing". Further, processing for storing the KV data 171 stored in the cache area 161 in the storage apparatus 105 is referred to as "unloading processing".

The KV data management information 151 is information for managing the KV data 171 stored in the storage area of the distributed KVS server 102 that forms the cache area 161. The file arrangement information 152 is information for managing a correspondence relationship between the cache area 161 and the file 181. The KV data structure information 153 is information for managing a correspondence relationship between the record of the file 181 and the KV data 171.

The KV data management information 151, the file arrangement information 152, and the KV data structure information 153 are described later in detail with reference to FIG. 7, FIG. 8, and FIG. 9.

It should be noted that the program and the data that are stored in the memory 112 and the memory 122 do not need to be always stored in the memory 112 or the memory 122, and may be stored in a storage apparatus (not shown), an external storage apparatus (not shown), or the like. In this case, as the need arises, the program or the data are read from the storage apparatus or the external storage apparatus into the memory 112 or the memory 114. It should be noted that when data is read, a part or all of the data can be read.

It should be noted that the file system 131, the file system 144, and the distributed KVS management module 142 may be provided as a part of an operating system (OS) (not shown) or an input/output library to be used by a user application program (not shown).

It should be noted that the distributed KVS server 102 illustrated in FIG. 1 does not need to be a physical computer, and may be a logical computer. In this case, computer resources such as the processor 121, the memory 122, and the interface 123 are allocated to the logical computer as logical computer resources by a virtualization program (not shown) or the like.

It should be noted that the server 101 may be the distributed KVS server 102. In this case, at least one distributed KVS server 102 may hold the file management information 132 and the record definition information 133. Further, in FIG. 1, every one of the distributed KVS servers 102 includes the loader 143, but this invention is not limited thereto, and it suffices that at least one distributed KVS server 102 include the loader 143.

FIG. 4 is an explanatory diagram for showing an example of the file management information 132 according to the first embodiment of this invention.

The file management information 132 includes a file ID 401, a permission 402, an owner 403, a size 404, a time stamp 405, a pointer 406 to the record definition information, and storage location information 407.

The file ID 401 stores identification information on the file 181 stored in the storage apparatus 105. The file ID 401 may store any kind of information capable of uniquely identifying the file 181. For example, the file ID 401 stores a full-path file name, a table name within a DB, or the like. In this embodiment, it is assumed that the file name is stored in the file ID 401.

The permission 402 stores information relating to an access authority of the file 181. The owner 403 stores information indicating an owner of the file 181. The size 404 stores information indicating a size of the file 181. The time stamp 405 stores information indicating a date/time at which the file 181 was updated.

The pointer 406 to the record definition information stores a pointer to the record definition information 133 corresponding to the file 181. The storage location information 407 stores information relating to the storage location of the file 181. In this embodiment, a plurality of files 181 are stored in the storage apparatus 105 coupled to the respective distributed KVS servers 102, and hence the storage location information 407 stores, for example, the identifier of the distributed KVS server 102 and the identification information on the storage apparatus 105.

Figure 5:
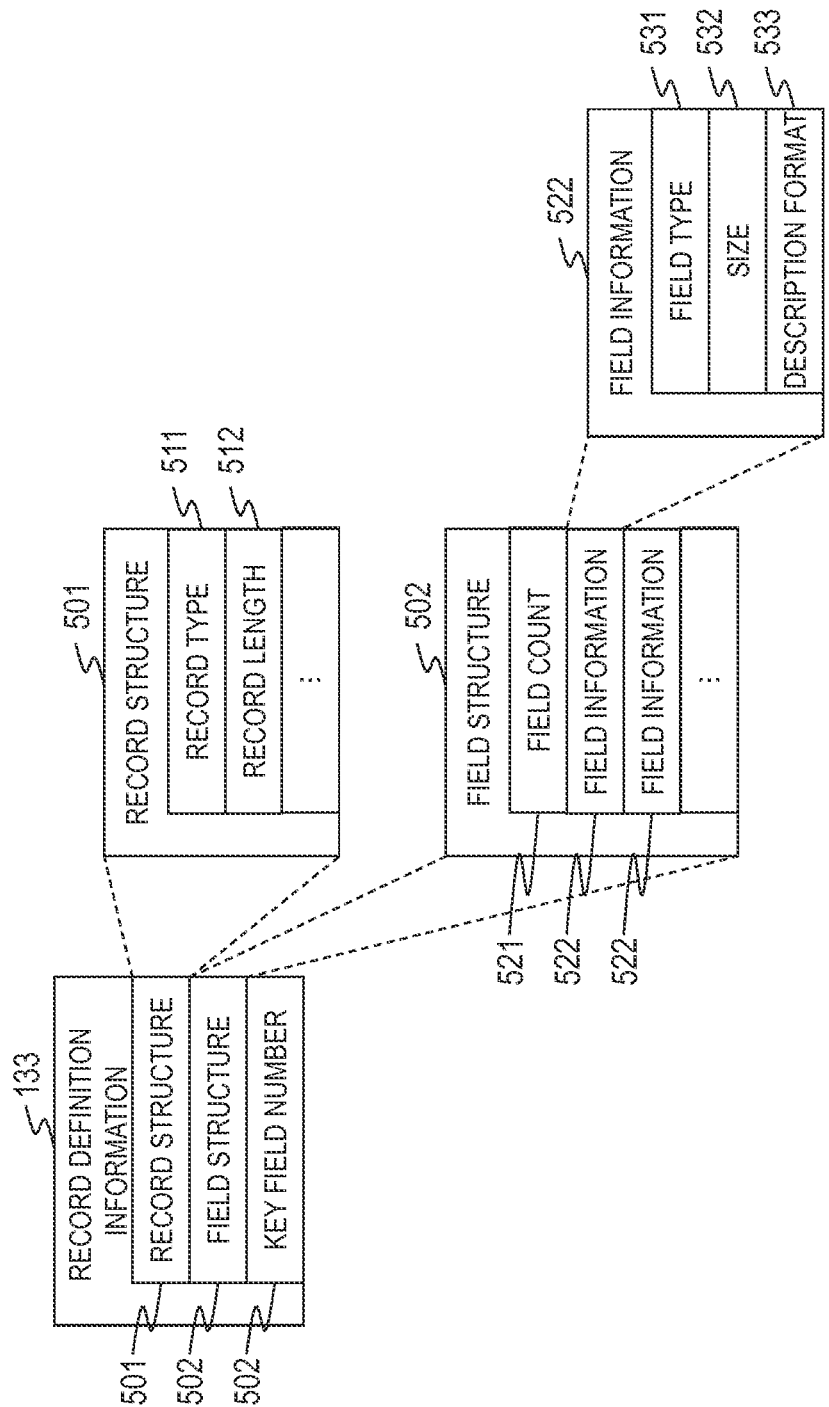
FIG. 5 is an explanatory diagram for showing a structural example of record definition information according to the first embodiment of this invention.

FIG. 5 is an explanatory diagram for showing a structural example of the record definition information 133 according to the first embodiment of this invention.

The record definition information 133 includes a record structure 501, a field structure 502, and a key field number 503.

The record structure 501 stores information for grasping the record structure of the file 181, and includes a record type 511 and a record length 512. It should be noted that the record structure 501 may include information other than the record type 511 or the record length 512.

The record type 511 stores information indicating which of a fixed-length record and a variable-length record the record of the file 181 is. When the record type 511 stores the information indicating the fixed-length record, the file 181 is formed of records having the same predetermined length. When the record type 511 stores the information indicating the variable-length record, the file 181 is formed of records having different lengths.

The record length 512 stores information indicating a length of one record when the record type 511 stores the information indicating the fixed-length record.

It should be noted that the record structure 501 does not need to include all the information of the record type 511 and the record length 512 as long as the record structure 501 stores information that allows a structure of the record to be grasped. The field structure 502 stores information for identifying the field included in the record, and includes a field count 521 and field information 522.

The field count 521 stores the number of fields included in one record. The field information 522 stores information relating to data recorded in each field, and includes a field type 531, a size 532, and a description format 533.

When the record type 511 stores the information indicating the variable-length record, the field type 531 stores information indicating which of a variable length field and a fixed length field the field corresponding to the record is.

The size 532 stores the information indicating a size of the field. The description format 533 stores a description format, such as ASCII or binary, of the data recorded in the field.

It should be noted that the field structure 502 does not need to include all the information of the field count 521 and the field information 522 as long as the field included in the record can be grasped.

In a case where the file 181 is formed of the fixed-length records, individual records can be recognized by the value set in the record length 512. On the other hand, in a case where the file 181 is formed of the variable-length records, a field for recording a size of the record is provided at a head of each record, and based on the field, a segment of the record can be determined.

Further, in a case where the record is the variable-length record, the first field is identified based on information stored in the field structure 502, which allows the size of the record to be calculated. After the record is recognized, the field can be grasped by referring to the field count 521 of the field structure 502 and the size 532 of the field information 522.

FIG. 6 is an explanatory diagram for illustrating an example of a source program of the UAP 141 according to the first embodiment of this invention.

FIG. 6 is an illustration of a source code of the UAP 141 described by using a COBOL language. In the UAP 141 described by using the COBOL language, a record structure of the file as the data source is defined in the program.

In the example illustrated in FIG. 6, the structure of the file is defined in a "FILE SECTION" 602 in a "DATA DIVISION". Each file used for the program is defined by one file description term (FD) and at least one record description term subsequent thereto. In this embodiment, the record structure 501 and the field structure 502 of the record definition information 133 store information described in the "FILE SECTION" 602.

Figure 7:
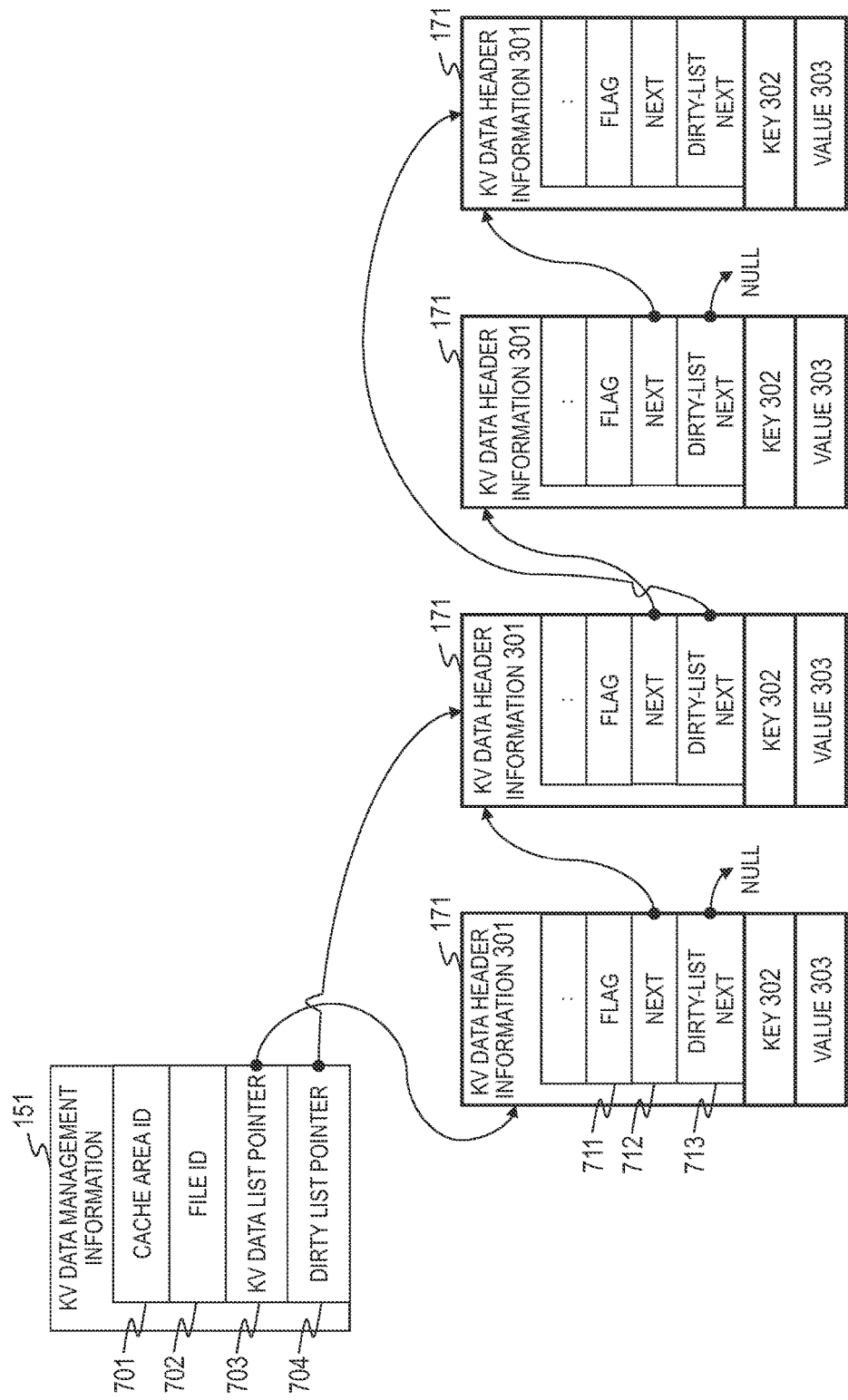
FIG. 7 is an explanatory diagram for showing an example of KV data management information and the KV data according to the first embodiment of this invention.

FIG. 7 is an explanatory diagram for showing an example of the KV data management information 151 and the KV data 171 according to the first embodiment of this invention.

The KV data management information 151 is generated when the plurality of pieces of KV data 171 are arranged on the respective distributed KVS servers 102. At this time, a KV data list is also generated. The KV data list is a list in which the plurality of pieces of KV data 171 arranged on the respective KVS servers 102 are arrayed in order of keys. Further, in this embodiment, a dirty list is generated or updated when the KV data 171 is updated. The distributed KVS management module 142, the loader 143, or the like can grasp the updated KV data 171 based on the dirty list.

First, the KV data header information 301 is described. The KV data header information 301 includes a flag 711, next 712, and dirty-list next 713.

The flag 711 stores a flag indicating that the KV data 171 has been updated. In this embodiment, it is assumed that the flag 711 before the KV data 171 is updated is set to "0", and the flag 711 after the KV data 171 is updated is set to "1".

The next 712 stores a pointer to a piece of KV data next to the piece of KV data 171 concerned in the KV data list. This allows tracking of all the plurality of pieces of KV data 171 included in the KV data list. The dirty-list next 713 stores a pointer to the piece of KV data 171 next to the pieces of KV data pair 171 concerned in the dirty list described later.

In this embodiment, two lists independent of each other, that is, the KV data list and the dirty list, are generated. The plurality of pieces of KV data 171, which is generated from one file 181 and is distributively arranged, can be grasped based on the KV data list. Further, the piece of updated KV data pair 171 among the plurality of pieces of KV data 171, which is generated from one file 181 and is distributibely arranged, can be grasped based on the dirty list.

Next, the KV data management information 151 is described. The KV data management information 151 includes a cache area ID 701, a file ID 702, a KV data list pointer 703, and a dirty list pointer 704.

The cache area ID 701 stores identification information on the cache area 161. The file ID 702 stores identification information on the file 181 that is a source of the KV data 171. The KV data list pointer 703 stores a pointer to the first piece of KV data 171 in the KV data list. The dirty list pointer 704 stores a pointer to the first piece of KV data 171 in the dirty list.

FIG. 8 is an explanatory diagram for showing an example of the file arrangement information 152 according to the first embodiment of this invention.

The file arrangement information 152 stores information on the file 181 that is the source of the KV data 171 stored in the cache area 161 for each cache area 161. Specifically, the file arrangement information 152 includes a cache area ID 801, a file ID 802, and a pointer 803 to the KV data structure information.

The cache area ID 801 stores identification information for identifying the cache area 161. The file ID 802 stores the identification information on the file 181 stored as the KV data 171 in the cache area 161 corresponding to the cache area ID 801. In this embodiment, the file name is stored. The pointer 803 to the KV data structure information stores a pointer to the KV data structure information 153 corresponding to an entry of the file arrangement information 152.

FIG. 9 is an explanatory diagram for showing an example of the KV data structure information 153 according to the first embodiment of this invention.

The KV data structure information 153 stores information regarding the structure of the record corresponding to the KV data 171 for each of the plurality of pieces of KV data 171. Specifically, the KV data structure information 153 includes an ID 901, a key 902, a value size 903, and an offset 904.

The ID 901 stores an identification number for uniquely identifying an entry of the KV data structure information 153. The entry of the KV data structure information 153 corresponds to a piece of KV data 171 generated from the file 181 corresponding to the file ID 802.

The key 902 stores information on the key of the KV data 171 generated from the file 181 corresponding to the file ID 802. The value size 903 stores a size of the KV data 171. The offset 904 stores information indicating a position of the record corresponding to the KV data 171 on the file 181 corresponding to the file ID 802.

Figure 10:
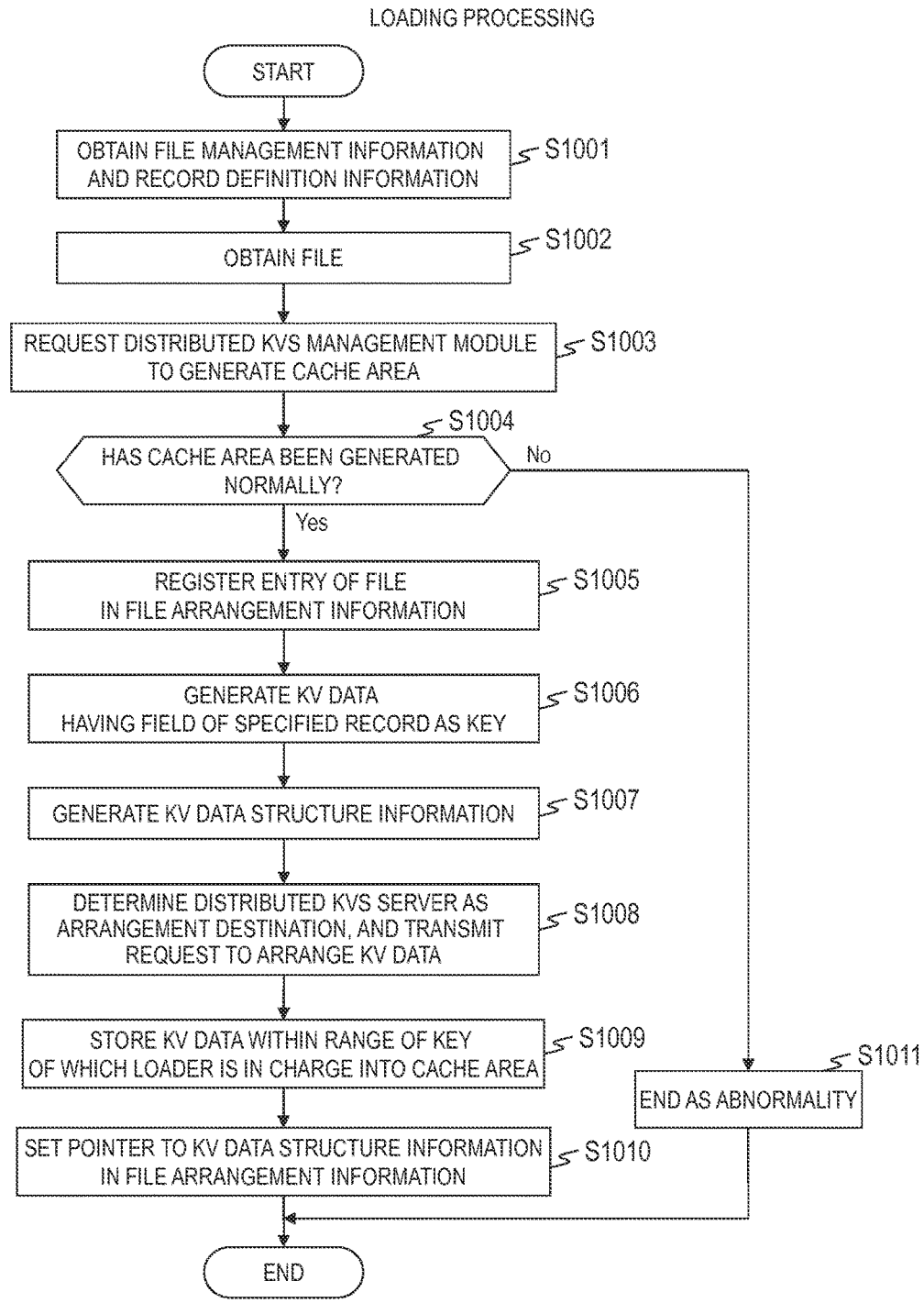
FIG. 10 is a flowchart for illustrating loading processing according to the first embodiment of this invention.

FIG. 10 is a flowchart for illustrating the loading processing according to the first embodiment of this invention.

The loader 143 starts processing in a case of receiving a loading instruction from the UAP 141 to load an arbitrary file 181 into the cache area 161. The loading instruction includes the identification information (file ID) on the file 181 to be processed and information on the field to be used as the key of the KV data 171. Further, the loading instruction includes the identification information (cache area ID) on the cache area 161 in which the KV data 171 is to be arranged.

It should be noted that, in the following description, it is assumed that the cache area 161 in which the KV data 171 is to be arranged has not been generated.

The loader 143 obtains the file management information 132 on the file 181 to be processed and the record definition information 133 on the file 181 to be processed (Step S1001). Specifically, the following processing is executed.

The loader 143 instructs the file system 144 to open the file to be processed. In a case of receiving the instruction to open the file, the file system 144 determines whether or not a cache of the file management information 132 on the file to be processed and the record definition information 133 is held.

In a case where it is determined that the cache of the file management information 132 on the file to be processed and the record definition information 133 on the file to be processed is held, the file system 144 returns, to the loader 143, the file management information 132 and the record definition information 133 that are cached along with a return value in response to the file opening.

On the other hand, in a case where it is determined that the cache of the file management information 132 on the file to be processed and the record definition information 133 on the file to be processed is not held, the file system 144 transmits an obtaining request for the file management information 132 and the record definition information 133 to the file system 131 of the server 101. The obtaining request includes the file ID.

The file system 131 of the server 101 retrieves the file management information 132 having the file ID 401 matching the file ID included in the obtaining request. The file system 131 obtains the record definition information 133 corresponding to the obtained file management information 132 based on the pointer 406 to the record definition information on the retrieved file management information 132. The file system 131 transmits the file management information 132 and the record definition information 133 to the file system 144 of the distributed KVS server 102.

In a case of receiving the file management information 132 and the record definition information 133, the file system 144 holds, in the cache, the file management information 132 and the record definition information 133 that have been received. Further, the file system 144 returns, to the loader 143, the file management information 132 and the record definition information 133 along with the return value in response to the file opening.

It should be noted that the return value includes information necessary to access the file 181 to be processed. For example, the storage location information 407 of the file management information 132 is stored as the return value. The processing of Step S1001 is executed as described above.

Subsequently, the loader 143 obtains the file 181 to be processed based on the storage location information 407 of the obtained file management information 132 (Step S1002). Specifically, the following processing is executed.

The loader 143 issues a read request including the file ID and the storage location information 407 to the file system 144. At this time, the file system 144 executes the following processing.

The file system 144 determines whether or not the distributed KVS server 102 on which the loader 143 executing the loading processing is running manages the file 181 to be processed. In the following description, the distributed KVS server 102 on which the loader 143 executing the loading processing is running is referred to also as "own distributed KVS server 102".

In a case where the own distributed KVS server 102 manages the file 181 to be processed, the file system 144 reads the file 181 to be processed from the storage apparatus 105 coupled to the own distributed KVS server 102 based on the file ID and the storage location information 407, and returns the file 181 to the loader 143.

On the other hand, in a case where the own distributed KVS server 102 does not manage the file 181 to be processed, the file system 144 identifies the distributed KVS server 102 that manages the file 181 to be processed based on the storage location information 407.

In addition, the file system 144 transmits the read request to the file system 144 of the identified distributed KVS server 102. The read request includes the storage location information 407 and the file ID. Herein, the file system 144 that has transmitted the read request is referred to as "request-side file system 144", and the file system 144 that has received the read request is referred to as "response-side file system 144".

In a case of receiving the read request, the response-side file system 144 reads the file 181 to be processed from the storage apparatus 105 based on the file ID and the storage location information 407 that are included in the read request. The response-side file system 144 transmits the file 181 to be processed that has been read to the request-side file system 144. The request-side file system 144 returns the read file 181 to the loader 143. The above-mentioned processing enables the loader 143 to obtain the file 181 managed by the distributed KVS server 102 other than the own distributed KVS server 102. Step S1002 is executed as described above.

Subsequently, the loader 143 transmits a generation request for the cache area 161 to the distributed KVS management module 142 (Step S1003). After that, the loader 143 stands by until receiving the reply from the distributed KVS management module 142. The generation request includes the identification information on the cache area 161 included in the loading instruction.

It should be noted that the distributed KVS management module 142 generates the cache area in cooperation with the distributed KVS management module 142 of another distributed KVS server 102. A known technology may be used for the generation processing for the cache area 161, and hence a detailed description thereof is omitted. At this time, management information (not shown) on the cache area 161 is generated together. The management information (not shown) on the cache area 161 stores the identification information on the cache area 161, a total capacity of the cache area 161, identification information on the distributed KVS server 102, a size of the storage area forming the cache area 161 on the distributed KVS server 102, and the like.

The loader 143 determines whether or not the cache area 161 has been generated normally (Step S1004). For example, in a case of receiving a notification that the generation has been completed from the distributed KVS management module 142, the loader 143 determines that the cache area 161 has been generated normally. On the other hand, in a case of receiving a notification that the generation has failed from the distributed KVS management module 142, or in a case of receiving no reply from the distributed KVS management module 142 for a fixed time period, the loader 143 determines that the cache area 161 has not been generated normally.

In a case of determining that the cache area 161 has not been generated normally, the loader 143 ends as abnormality (Step S1011). For example, the loader 143 notifies the UAP 141 that the loading processing has failed.

In a case of determining that the cache area 161 has been generated normally, the loader 143 registers an entry of the file 181 to be processed in the file arrangement information 152 (Step S1005). Specifically, the loader 143 adds the entry to the file arrangement information 152. The loader 143 sets the identification information on the newly generated cache area 161 in the cache area ID 801 of the added entry, and sets the information stored in the file ID 401 of the file management information 132 in the file ID 802.

The loader 143 generates the KV data 171 based on the information on the obtained file 181 and the field to be used as the key (Step S1006), and also generates the KV data structure information 153 (Step S1007). Specifically, the following processing is executed.

The loader 143 refers to the record definition information 133 to grasp the record structure of the file 181. Based on the grasped structure of the record, the loader 143 generates the key from the specified field, and also generates the KV data 171.

Further, the loader 143 determines the distributed KVS server 102 on which the KV data 171 is to be arranged based on the value of the key. At this time, the distributed KVS management module 142 generates a map in which a range of a key and an identifier of the KVS server 102 are associated with each other.

It should be noted that it is conceivable to employ a method of determining the range of the key by using, for example, a consistent hash method. Further, information regarding the range of the key may be held by determining the range of the key in advance.

The loader 143 generates entries in the KV data structure information 153, the number of the entries corresponding to the number of the generated KV data 171, and sets the identification number in the ID 901 of the generated entry in order from "1".

The loader 143 selects one of the plurality of pieces of generated KV data 171. The loader 143 refers to the record definition information 133 to identify a data size of the record corresponding to the piece of selected KV data 171 and the position of the record within the file 181 to be processed.

The loader 143 sets the key of the piece of selected KV data 171 in the key 902 of an empty entry, sets the size of the piece of KV data 171 in the value size 903, and sets the information indicating the position of the record corresponding to the piece of KV data 171 within the file 181 in the offset 904. The processing of Step S1006 and Step S1007 is executed as described above.

The loader 143 determines the distributed KVS server 102 as an arrangement destination of the generated KV data 171 based on the range of the key, and transmits an arrangement request for the KV data 171 to the determined distributed KVS server 102 (Step S1008). Specifically, the loader 143 transmits the arrangement request to the loader 143 of the determined distributed KVS server 102. It should be noted that the arrangement request is assumed to include the map, the KV data 171 included in the predetermined range of a key, the file arrangement information 152, and the KV data structure information 153.

The loader 143 arranges the KV data 171 within the range of the key of which the loader 143 itself is in charge in the storage area forming the cache area 161 (Step S1009). At this time, the loader 143 generates the KV data list and the KV data management information 151. Specifically, the loader 143 sorts pieces of KV data header information 301 in the order of the key, and sets a pointer to another piece of KV data 171 in the next 712 of each of the pieces of the KV data header information 301 based on a result of the sorting. In addition, the distributed KVS management module 142 generates the KV data management information 151, sets the identification information on the file 181 in the file ID 702, and sets the pointer to the piece of first KV data 171 within the KV data list in the KV data list pointer 703.

The loader 143 sets the pointer to the KV data structure information 153 in the pointer 803 to the KV data structure information of the file arrangement information 152 (Step S1010), and brings the processing to an end.

It should be noted that, in a case of receiving the arrangement request, the loader 143 of another distributed KVS server 102 executes the same processing as the processing of Step S1009 and Step S1010.

Figure 11:
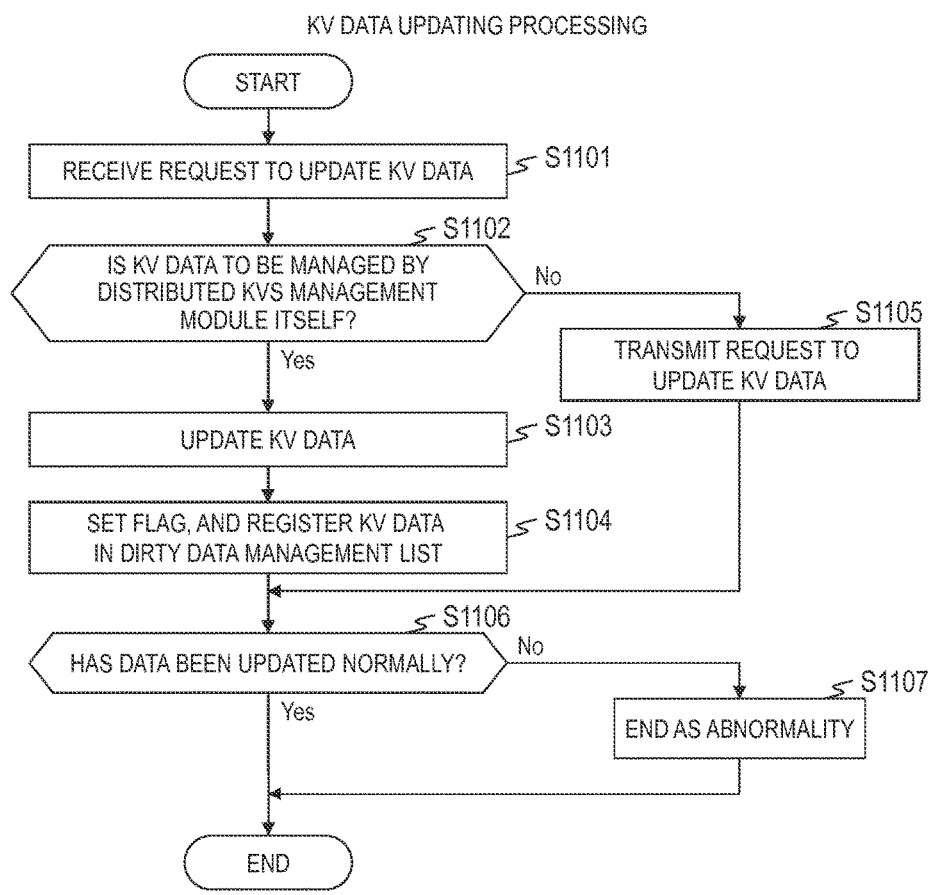
FIG. 11 is a flowchart for illustrating updating processing for the KV data according to the first embodiment of this invention.

FIG. 11 is a flowchart for illustrating updating processing for the KV data 171 according to the first embodiment of this invention.

The distributed KVS management module 142 receives a request to update the KV data 171 from the UAP 141 (Step S1101). The request to update the KV data 171 includes the key of the KV data 171 to be updated and update data.

The distributed KVS management module 142 determines whether or not the distributed KVS management module 142 itself manages the KV data 171 to be updated (Step S1102). Specifically, the distributed KVS management module 142 refers to the map based on the key to identify the distributed KVS server 102 that manages the KV data 171 to be updated, and determines whether or not the identified distributed KVS server 102 is the distributed KVS server 102 on which the distributed KVS management module 142 itself is running.

In a case of determining that the distributed KVS management module 142 itself manages the KV data 171 to be updated, the distributed KVS management module 142 executes the updating processing for the KV data 171 to be updated (Step S1103). The updating processing for the KV data 171 is known processing, and hence a detailed description thereof is omitted.

The distributed KVS management module 142 sets the flag in the updated KV data 171, and registers the updated KV data 171 in the dirty list (Step S1104). Specifically, the following processing is executed.

The distributed KVS management module 142 sets the flag 711 of the KV data header information 301 to "1", and verifies whether or not the dirty list has been generated.

In a case where the dirty list has not been generated, the distributed KVS management module 142 generates the dirty list. The distributed KVS management module 142 adds the KV data 171 updated in Step S1103 to the dirty list.

In a case where the dirty list has been generated, the distributed KVS management module 142 sets the pointer to the updated KV data 171 in the dirty-list next 713 of the piece of last KV data pair 171 in the dirty list, and adds the updated KV data 171 to the last of the dirty list. The processing of Step S1104 is executed as described above.

In a case of determining in Step S1102 that another distributed KVS server 102 manages the KV data 171 to be updated, the distributed KVS management module 142 transmits the request to update the KV data 171 to the another distributed KVS server 102 (Step S1105), and then advances to Step S1106. The request to update the KV data 171 includes the key of the KV data 171 to be updated and the update data.

In a case of receiving the request to update the KV data 171, the distributed KVS management module 142 of the another distributed KVS server 102 executes the same processing as the processing of Step S1103 and Step S1104, and transmits the execution result to the distributed KVS management module 142 that has transmitted the request to update the KV data 171.

The distributed KVS management module 142 determines whether or not the KV data 171 has been updated normally (Step S1106).

In a case of determining that the KV data 171 has been updated normally, the distributed KVS management module 142 brings the processing to an end. In a case of determining that the KV data 171 has not been updated normally, the distributed KVS management module 142 ends as abnormality (Step S1107). For example, the distributed KVS management module 142 notifies the UAP 141 that the updating processing for the KV data 171 has failed.

In this embodiment, as described with reference to FIG. 11, the distributed KVS management module 142 assigns the flag indicating that the KV data 171 has been updated to the updated KV data 171, and generates the list (dirty list) of the piece of updated KV data 171. This allows the piece of updated KV data 171 to be identified.

Figure 12:
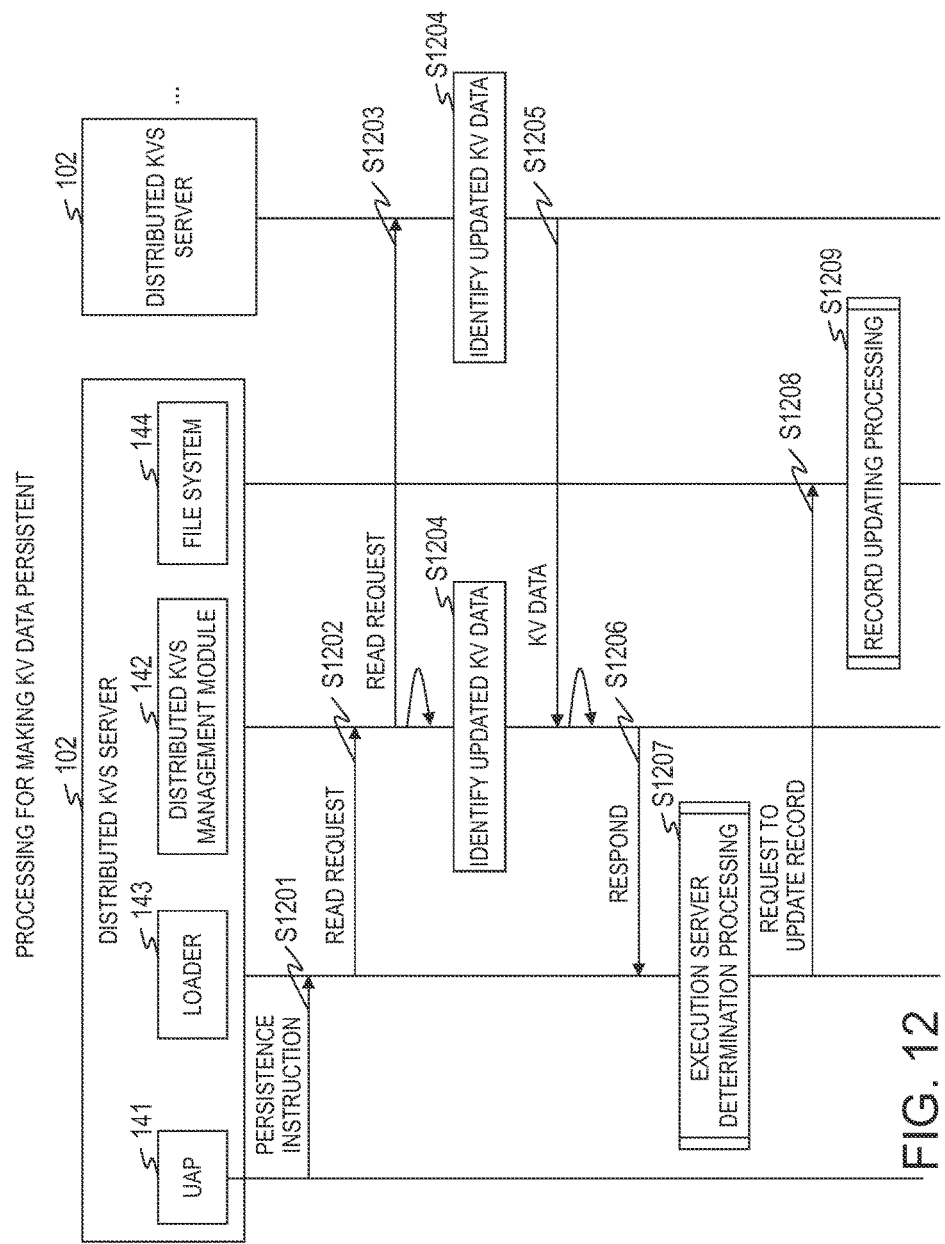
FIG. 12 is a sequence diagram for illustrating a flow of processing for making KV data persistent according to the first embodiment of this invention.

FIG. 12 is a sequence diagram for illustrating a flow of processing for making KV data persistent according to the first embodiment of this invention.

The UAP 141 on one distributed KVS server 102 transmits, to the loader 143, a persistence instruction to instruct the loader 143 to reflect the updated KV data 171 in the file 181 (Step S1201). The persistence instruction includes the identification information on the cache area 161 to be processed.

In the following description, the loader 143, the distributed KVS management module 142, and the file system 144 that are included in the distributed KVS server 102 that first received the persistence instruction are referred to also as "master loader 143, master distributed KVS management module 142, and master file system 144". Further, the loader 143, the distributed KVS management module 142, and the file system 144 that are included in the distributed KVS server 102 other than the above-mentioned distributed KVS server 102 are referred to also as "slave loader 143, slave distributed KVS management module 142, and slave file system 144". It should be noted that the master loader 143 and the slave loader 143 are referred to as "loader 143" when used without distinction, the master distributed KVS management module 142 and the slave distributed KVS management module 142 are referred to as "distributed KVS management module 142" when used without distinction, and the master file system 144 and the slave file system 144 are referred to as "file system 144" when used without distinction.

The master loader 143 transmits the read request for the KV data 171 stored in the cache area 161 to be processed to the master distributed KVS management module 142 (Step S1202). The read request includes the identification information on the cache area 161 to be processed.

The master distributed KVS management module 142 identifies the distributed KVS server 102 forming the cache area 161 to be processed, and transmits the read request to the distributed KVS management module 142 of the identified distributed KVS server 102 (Step S1203). The read request includes the identification information on the cache area 161 to be processed.

For example, the master distributed KVS management module 142 can identify the distributed KVS server 102 forming the cache area 161 to be processed based on the management information (not shown) on the cache area 161. It should be noted that, in a case where the master distributed KVS management module 142 forms the cache area 161 to be processed, the master distributed KVS management module 142 also transmits the read request to itself. Herein, it is assumed that the read request is transmitted to both the master distributed KVS management module 142 and the slave distributed KVS management module 142.

In a case of receiving the read request, the distributed KVS management module 142 identifies the piece of updated KV data 171 from among the plurality of pieces of KV data 171 stored in the cache area 161 to be processed (Step S1204). Specifically, the distributed KVS management module 142 refers to the KV data management information 151 to retrieve a piece of KV data management information 151 having the cache area ID 701 storing the identification information on the cache area 161 to be processed. The distributed KVS management module 142 identifies the KV data 171 registered in the dirty list based on the dirty list pointer 704 of the retrieved piece of KV data management information 151.

The master distributed KVS management module 142 and the slave distributed KVS management module 142 transmit the identified KV data 171 to the master distributed KVS management module 142 (Step S1205).

The master distributed KVS management module 142 transmits a response indicating that the reading of the updated KV data 171 has been completed to the master loader 143 (Step S1206).

The master loader 143 executes execution server determination processing (Step S1207). The execution server determination processing is processing for determining an execution server (distributed KVS server 102) on which the updated KV data 171 is to be reflected in the file 181. The execution server determination processing is described later in detail with reference to FIG. 13.

The master loader 143 transmits a request to update a record to the distributed KVS server 102 determined in the execution server determination processing (Step S1208). The request to update the record includes the identification information on the file 181 to be processed and the updated KV data 171.

In a case where the distributed KVS server 102 including the master loader 143 is determined as the execution server, the master loader 143 transmits the request to update the record to the master file system 144. Further, in a case where another distributed KVS server 102 is determined as the execution server, the master loader 143 transmits the request to update the record to the slave loader 143 of the another distributed KVS server 102. The slave loader 143 transmits the request to update the record to the slave file system 144.

In a case of receiving the request to update the record, the file system 144 executes record updating processing in order to reflect the updated KV data 171 in the file 181 (Step S1209). The record updating processing is described later in detail with reference to FIG. 14.

After the record updating processing ends, the file system 144 may notify the master loader 143 that the processing has been completed. In this case, the master loader 143 notifies the UAP 141 that the processing has ended normally.

Figure 13:
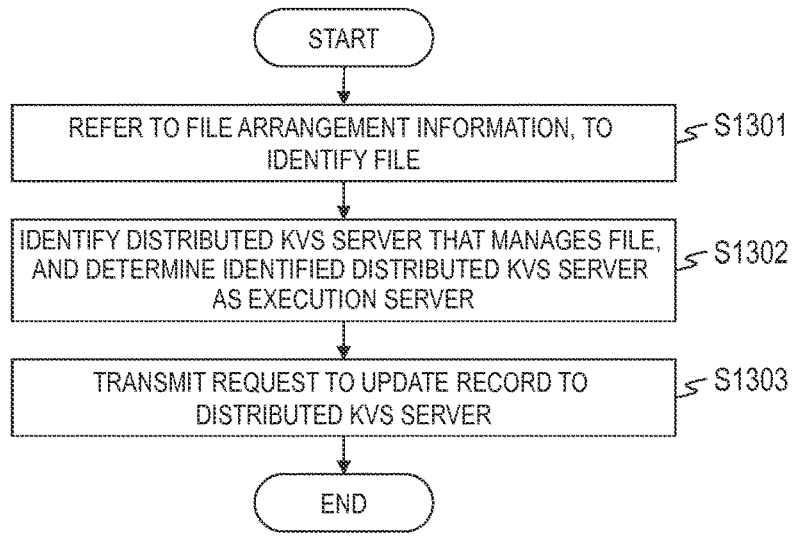
FIG. 13 is a flowchart for illustrating an example of execution server determination processing according to the first embodiment of this invention.

FIG. 13 is a flowchart for illustrating an example of the execution server determination processing according to the first embodiment of this invention.

In a case of receiving the response indicating that the reading of the KV data 171 has been completed from the master distributed KVS management module 142, the master loader 143 starts the execution server determination processing. First, the master loader 143 identifies the file 181 corresponding to the KV data 171 stored in the cache area 161 to be processed (Step S1301). Specifically, the following processing is executed.

The master loader 143 refers to the file arrangement information 152 to retrieve the entry having the cache area ID 801 matching the identification information on the cache area 161 to be processed. The master loader 143 identifies the file 181 corresponding to the KV data 171 based on the file ID 802 of the retrieved entry.

The master loader 143 instructs the master file system 144 to open the file 181 to be processed. The file system 144 returns the file management information 132 and the record definition information 133 that are cached along with the return value in response to the file opening. The processing of Step S1301 is executed as described above.

Subsequently, the master loader 143 refers to the storage location information 407 of the file management information 132 to identify the distributed KVS server 102 that manages the file 181 to be processed, and determines the identified distributed KVS server 102 as the execution server (Step S1302). Further, the master loader 143 transmits the request to update the record to the loader 143 of the distributed KVS server 102 determined as the execution server (Step S1303), and brings the processing to an end.

Figure 14:
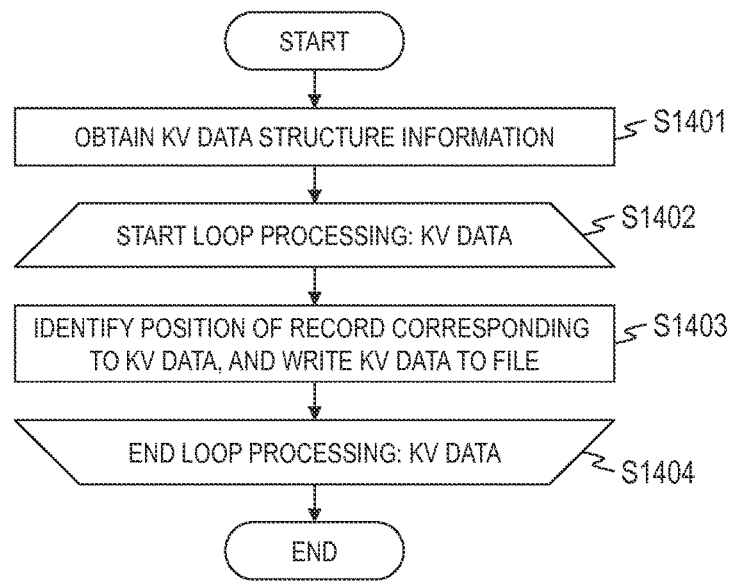
FIG. 14 is a flowchart for illustrating an example of record updating processing according to the first embodiment of this invention.

FIG. 14 is a flowchart for illustrating an example of the record updating processing according to the first embodiment of this invention.

In a case of receiving the request to update the record from the loader 143, the file system 144 starts the record updating processing. First, the file system 144 obtains the KV data structure information 153 corresponding to the file 181 to be processed (Step S1401). Specifically, the file system 144 refers to the file arrangement information 152 to retrieve the entry having the file ID 802 matching the identification information on the file 181 to be processed. The file system 144 refers to the pointer 803 to the KV data structure information 153 of the retrieved entry to obtain the KV data structure information 153.

The file system 144 starts loop processing for the KV data 171 (Step S1402). The file system 144 selects a piece of KV data 171 included in the request to update the record.

The file system 144 identifies the position of the record corresponding to the KV data 171 within the file 181 to be processed, and writes the KV data 171 in the identified position (Step S1403). Specifically, the following processing is executed.

The file system 144 refers to the obtained KV data structure information 153 to retrieve the entry having the key 902 matching the key 302 of the piece of selected KV data 171. The file system 144 identifies the position of the record corresponding to the updated KV data 171 within the file 181 to be processed based on the value size 903 and the offset 904 of the retrieved entry.

The file system 144 overwrites the updated KV data 171 in the identified position, to thereby reflect the updated KV data 171 in the file 181 to be processed. The processing of Step S1403 is executed as described above.

Subsequently, the file system 144 determines whether or not the processing has been completed for all the plurality of pieces of KV data 171 included in the request to update the record (Step S1404).

In a case of determining that the processing has not been completed for all the plurality of pieces of KV data 171, the file system 144 returns to Step S1402 to execute the same processing. In a case of determining that the processing has been completed for all the plurality of pieces of KV data 171, the file system 144 brings the processing to an end.

The updating of the existing KV data 171 has been described so far, but the same processing can also be applied to addition of new KV data 171 and deletion of the KV data 171.

(Addition of KV Data 171)

Processing for adding KV data is substantially the same as, but is partially different from, KV data updating processing illustrated in FIG. 11.

First, in the processing for adding the KV data, the UAP 141 transmits a request to add new KV data 171 to the distributed KVS management module 142 and the loader 143.

The processing of Step S1101 and Step S1102 is the same processing as the processing illustrated in FIG. 11.

In Step S1103, the distributed KVS management module 142 adds the KV data 171 to the cache area 161.

In Step S1104, the distributed KVS management module 142 sets the flag 711 of the KV data header information 301 to "1". The processing for adding new KV data 171 to the KV data list is the same as the processing described in Step S1104.

The processing of Step S1105 and the subsequent steps is the same processing as the processing illustrated in FIG. 11.

On the other hand, after receiving the request to add the new KV data 171, the loader 143 adds the entry to the KV data structure information 153, sets the identification number in the ID 901 of the added entry, and sets the value in each of the key 902 and the value size 903. The distributed KVS management module 142 calculates an offset of the added KV data 171 within the file based on the value size 903 and the offset 904 of an entry immediately above the added entry. In the following description, the entry immediately above the added entry is referred to also as "upper entry".

For example, it is conceivable to employ a method of setting, in the offset 904 of the added entry, a value calculated by adding the value size 903 to the offset 904 of the upper entry.

The other processing is the same as the processing according to the first embodiment, and hence a description thereof is omitted.

(Deletion of KV Data 171)

Processing for deleting the KV data is substantially the same as, but is partially different from, the processing illustrated in FIG. 11.

The processing of Step S1101 and Step S1102 is the same processing as the processing illustrated in FIG. 11.

In Step S1103, the distributed KVS management module 142 deletes the KV data 171 from the cache area 161. At this time, the distributed KVS management module 142 deletes only the value 303, and holds the key 302 and the KV data header information 301 as they are. Conceivable in addition to the above-mentioned processing is processing for nullifying the value 303, processing for writing data such as "0" in the value 303, or other such processing.

In Step S1104, the distributed KVS management module 142 sets "−1" indicating that the KV data has been deleted in the flag 711 of the KV data header information 301. Further, the distributed KVS management module 142 deletes the piece of KV data 171 from the KV data list. The updating processing for the KV data 171 is known processing, and hence a detailed description thereof is omitted, but it is conceivable to employ a method of changing the pointer to the deleted KV data 171 to the pointer to another piece of KV data 171.

The processing of Step S1105 and the subsequent steps is the same processing as the processing illustrated in FIG. 11.

Processing for making the KV data persistent is substantially the same as, but is partially different from, the processing illustrated in FIG. 12.

The processing of Step S1201 to Step S1203 is the same processing as the processing illustrated in FIG. 12.

In Step S1204, the master distributed KVS management module 142 and the slave distributed KVS management module 142 each refer to the dirty list to identify the updated KV data 171 and the deleted KV data 171, and read the identified KV data 171 from the cache area 161.

In Step S1205, after the identified KV data 171 is transmitted to the master distributed KVS management module 142, the master distributed KVS management module 142 and the slave distributed KVS management module 142 each delete the KV data 171 having the flag 711 set to "−1" from the cache area 161. The flow of the processing of Step S1206 and the subsequent steps is the same as that of the first embodiment, but differs from that of the first embodiment in partial contents of the execution server determination processing and the record updating processing.

In the execution server determination processing, the master loader 143 divides the read KV data 171 into the updated KV data 171 and the deleted KV data 171. Specifically, the master loader 143 refers to the flag 711 of the KV data header information 301 of the KV data 171 to divide the read KV data 171 into the KV data 171 having the flag 711 set to "1" and the KV data 171 having the flag 711 set to "−1".

The master loader 143 executes the processing of Step S1301 to Step S1303 for the updated KV data 171, and executes the processing of Step S1301 to Step S1303 for the deleted KV data 171. In other words, two requests to update the record, which include the request to update the record relating to the instruction for the updating of the record of the file 181 and the request to update the record relating to the instruction for the deletion of the record from the file 181, are transmitted.

In a case where the distributed KVS server 102 receives the request to update the record relating to the instruction for the updating of the record of the file 181, the same processing as that of the first embodiment is executed. On the other hand, in a case where the distributed KVS server 102 receives the request to update the record relating to the instruction for the deletion of the record from the file 181, the following processing is executed.

The processing of Step S1401 and Step S1402 is the same processing as the processing illustrated in FIG. 14.

In Step S1403, the file system 144 identifies a position of the record corresponding to the deleted KV data 171 within the file 181 to be processed, and deletes data corresponding to the value size 903 from the identified position.

Specifically, the file system 144 identifies the position of the record corresponding to the deleted KV data 171 within the file 181 to be processed based on the value size 903 and the offset 904 of the retrieved entry.

The file system 144 deletes the data corresponding to the value size 903 from the identified position (offset). In addition, the file system 144 nullifies the retrieved entry from the KV data structure information 153.

The other processing is the same as the processing according to the first embodiment, and hence a description thereof is omitted.

According to the first embodiment, a result of updating or deleting the KV data 171 can be reflected in the file (data source). With this configuration, the file system and the distributed KVS can cooperate with each other, and it is possible to access data having the same contents by using any one of a file I/O API and a KV data API.

[Modification Example]

In the first embodiment, the file management information 132 and the record definition information 133 are used to grasp the record structure of the file 181, but the record definition information on the file 181 may be set in the distributed KVS server 102 in advance.

Figure 15:
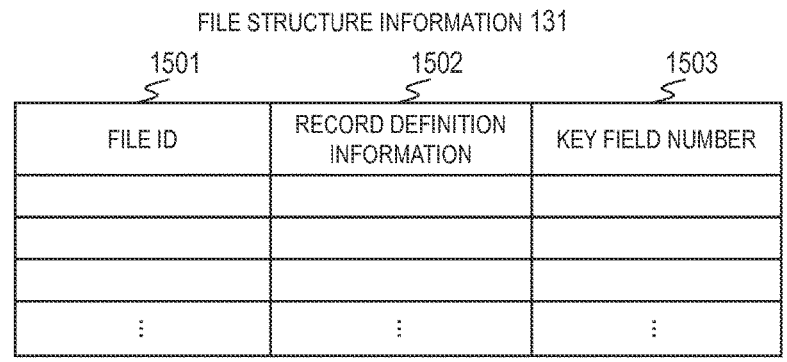
FIG. 15 is an explanatory diagram for showing an example of file structure information according to a modification example of the first embodiment of this invention.

FIG. 15 is an explanatory diagram for showing an example of file structure information 1500 according to a modification example of the first embodiment of this invention.

The file structure information 1500 is information for managing the correspondence relationship among the file 181, the record, and the field to be used as the key of the KV data 171, and includes a file ID 1501, record definition information 1502, and a key field number 1503. In the modification example, the file structure information 1500 is registered in the distributed KVS server 102 in advance.

The file ID 1501 stores the identification information on the file 181 stored in the storage apparatus 105. The file ID 1501 is the same as the file ID 401. The record definition information 1502 stores the management information on the record forming the file 181. The record definition information 1502 is the same as the record definition information 133. The key field number 1503 stores the identification number of the field to be used as the key of the KV data 171 generated from the file 181. The key field number 1503 is blank before the KV data 171 is generated.

Figure 16:
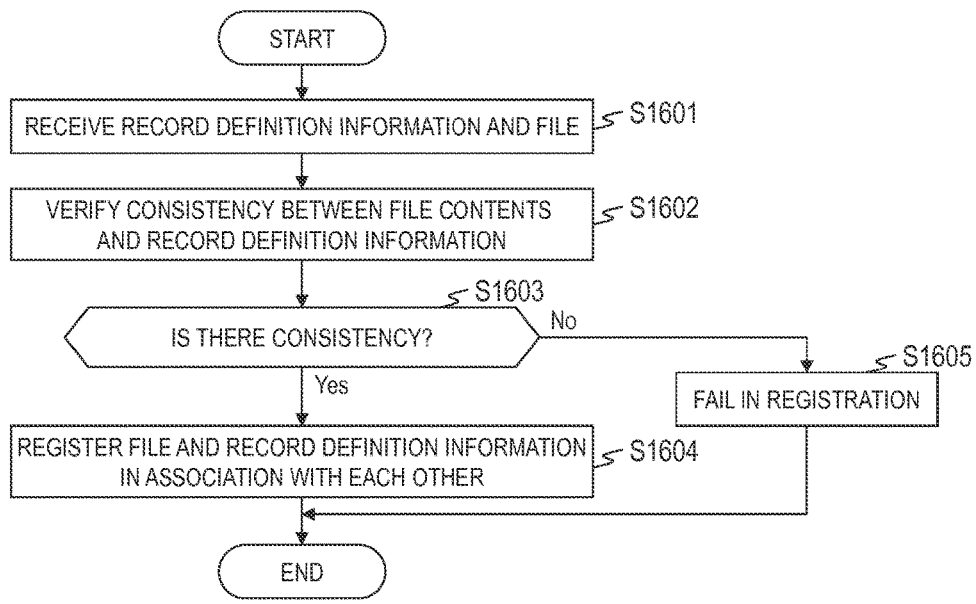
FIG. 16 is a flowchart for illustrating an example of registration processing for the file structure information according to the modification example of the first embodiment of this invention.

FIG. 16 is a flowchart for illustrating an example of registration processing for the file structure information 1500 according to the modification example of the first embodiment of this invention.

In a case where the file 181 is stored into the storage apparatus 105, the registration processing for the file structure information 1500 is executed.

The file system 144 receives the file 181 and the record definition information on the file 181 defined by the user (Step S1601).

The file system 144 compares the contents of the file 181 with the record definition information to verify consistency there between (Step S1602), and determines whether or not there is consistency between the contents of the file 181 and the record definition information (Step S1603).

In a case of determining that there is no consistency between the contents of the file 181 and the record definition information, the file system 144 notifies that the file structure information 1500 has failed in registration (Step S1605), and brings the processing to an end.

In a case of determining that there is consistency between the contents of the file 181 and the record definition information, the file system 144 registers the file 181 and the record definition information in the file structure information 1500 in association with each other (Step S1604), and brings the processing to an end. Specifically, the file system 144 adds the entry to the file structure information 1500. The file system 144 sets the identification information on the file 181 in the file ID 1501 of the added entry, and also sets the received record definition information in the record definition information 1502 of the added entry. At this time point, the KV data 171 corresponding to the file 181 is not generated, and hence the key field number 1503 is blank.

It should be noted that the file system 144 notifies the file system 144 of another distributed KVS server 102 of the information on the added entry. The file system 144 of the another distributed KVS server 102 updates the file structure information 1500 based on the notification.

Figure 17:
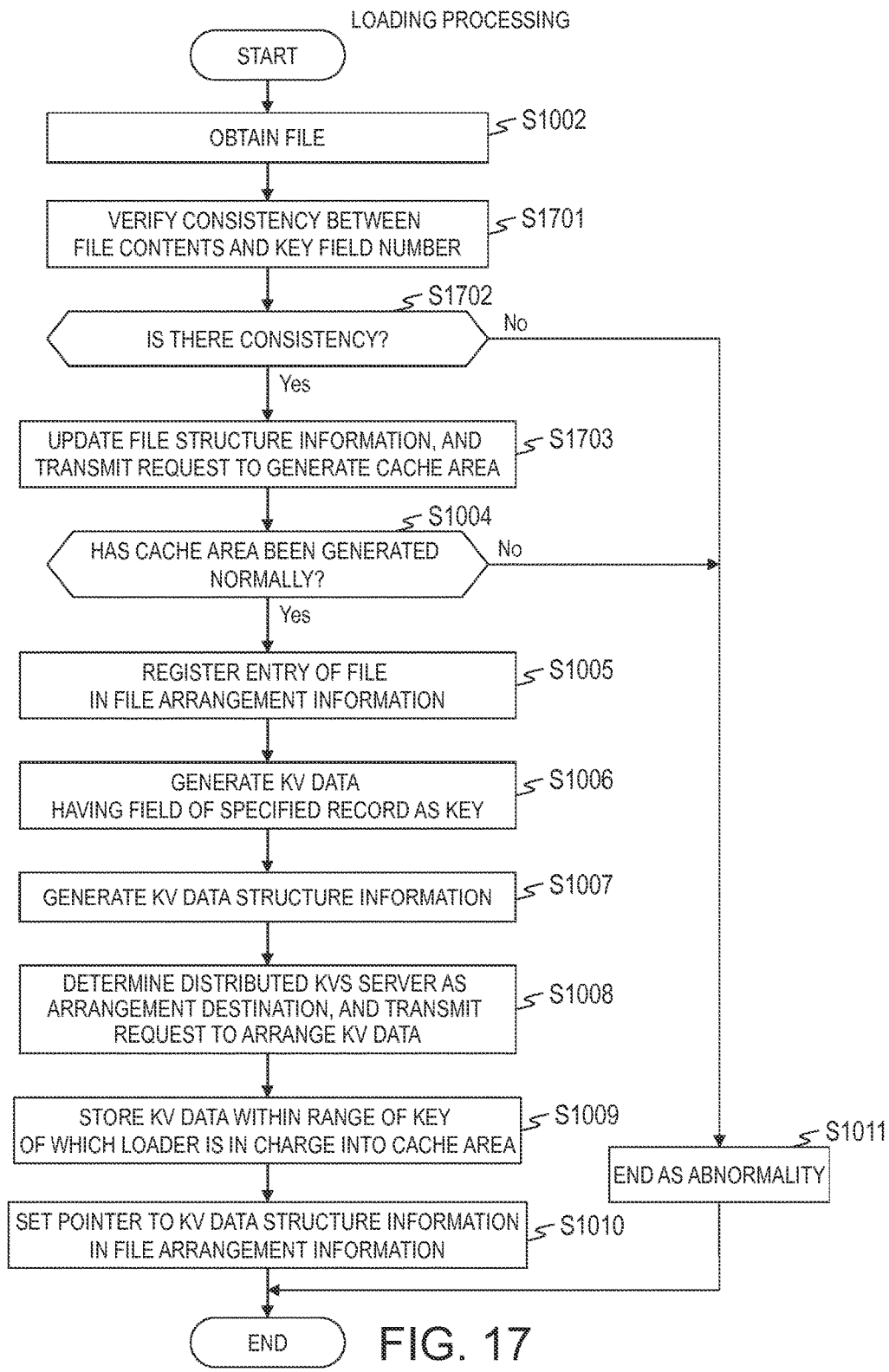
FIG. 17 is a flowchart for illustrating an example of the loading processing according to the modification example of the first embodiment of this invention.

FIG. 17 is a flowchart for illustrating an example of the loading processing according to the modification example of the first embodiment of this invention. A description is mainly made of differences from the first embodiment below.

In the modification example, the file structure information 1500 is used in place of the file management information 132 and the record definition information 133, and hence the processing of Step S1001 is omitted.

After obtaining the file 181, the loader 143 verifies consistency between the contents of the file 181 and the information on the field to be used as the key (Step S1701), and determines whether or not there is consistency between the contents of the file 181 and the information on the field (Step S1702).

In a case of determining that there is no consistency between the contents of the file 181 and the information on the field, the loader 143 advances to Step S1011.

In a case of determining that there is consistency between the contents of the file 181 and the information on the field, the loader 143 updates file structure information, and further transmits the generation request for the cache area 161 to the distributed KVS management module 142 (Step S1703). Specifically, the loader 143 refers to the file structure information 1500 to retrieve the entry having the file ID 1501 matching the identification information on the file 181 to be processed. The loader 143 sets the information on the field specified in the key field number 1503 of the retrieved entry.

In Step S1007, the KV data 171 is generated based on the file structure information 1500. The other processing is the same as the processing according to the first embodiment, and hence a description thereof is omitted.

Second Embodiment

A second embodiment of this invention is different from the first embodiment in that one file 181 is divided into a plurality of subfiles 1811 and that the subfiles 1811 are stored in the plurality of storage apparatus 105 coupled to distributed KVS servers 102. A description of the second embodiment is mainly made of differences from the first embodiment below.

Figure 18:
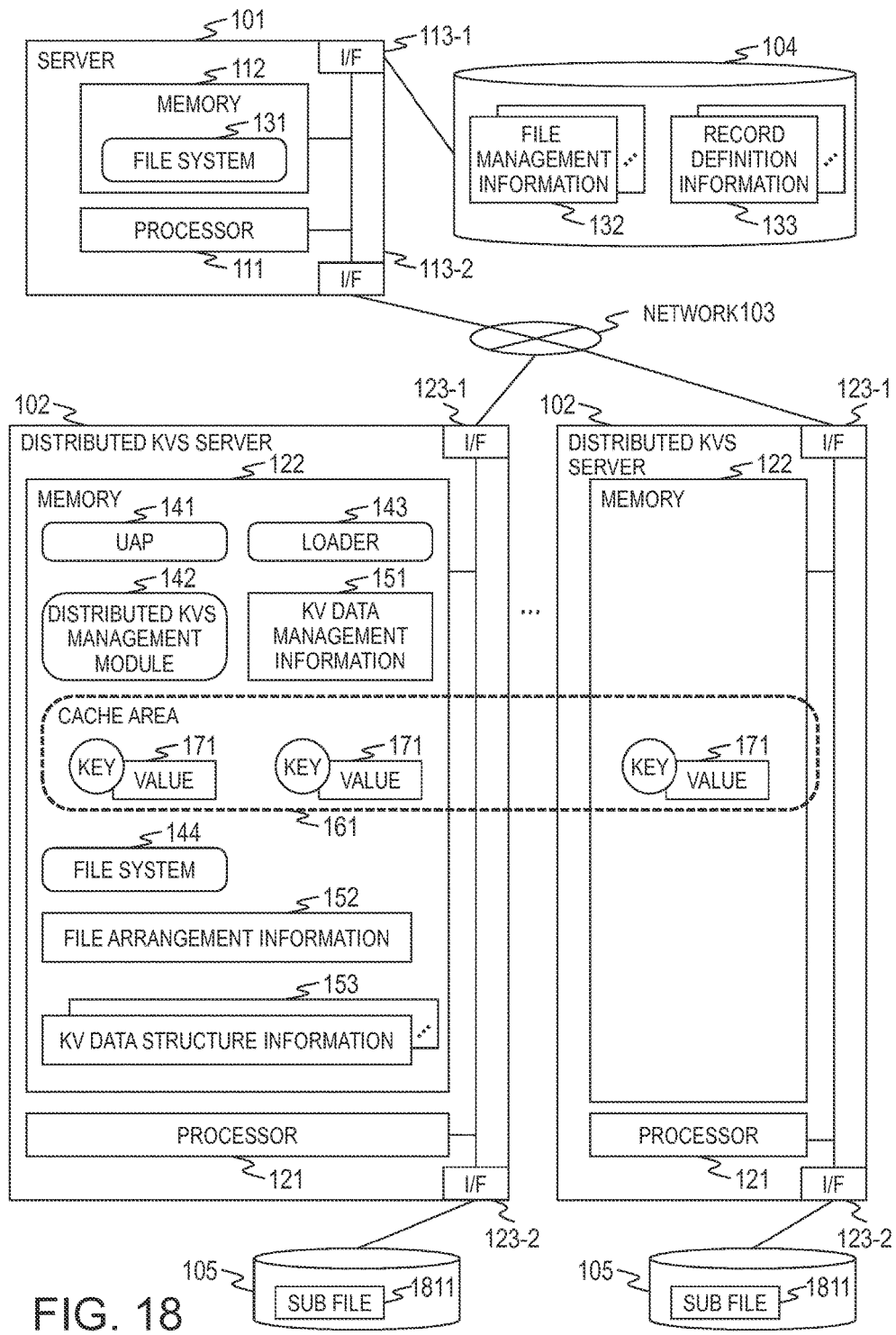
FIG. 18 is a block diagram for illustrating a configuration example of a computer system according to a second embodiment of this invention.

FIG. 18 is a block diagram for illustrating a configuration example of a computer system according to a second embodiment of this invention. The computer system according to the second embodiment has the same configuration as that of the computer system according to the first embodiment. The second embodiment is different from the first embodiment in that the storage apparatus 105 stores the subfile 1811. Further, in the first embodiment, it suffices that at least one distributed KVS server 102 includes the loader 143, but in the second embodiment, it is assumed that all the distributed KVS servers 102 include the loader 143.

The subfile 1811 is file data obtained by dividing one file 181, and is formed of pieces of data (block data) obtained by dividing the file 181 in units of blocks. One piece of block data can include a plurality of records. However, a size of the block sometimes does not match a size of the record, and hence data on one record may be included in a plurality of pieces of block data.

In this embodiment, in a case where the file system 131 stores the file 181 in the storage apparatus 105, the file system 131 divides the file 181 into pieces of block data each having a predetermined size, and distributively stores a predetermined number of block data groups having serial addresses onto the plurality of storage apparatus 105. In this embodiment, general striping is assumed to be employed. It should be noted that the file 181 is assumed to be divided in order from the first record.

Now, a case where the file 181 is distributively stored in four storage apparatus 105, that is, a case where a stripe count is "4", is described as an example. In the following description, it is assumed that the four storage apparatus 105 are Storage Apparatus A, Storage Apparatus B, Storage Apparatus C, and Storage Apparatus D, the size of the block is "64 KB", and the stripe size is "16 blocks".

In this case, the file system 131 divides the file 181 into pieces of block data in units of "64 KB", and stores pieces of block data having block numbers of "1" to "16" into Storage Apparatus A, pieces of block data having block numbers of "17" to "32" onto Storage Apparatus B, pieces of block data having block numbers of "33" to "48" onto Storage Apparatus C, and pieces of block data having block numbers of "49" to "64" onto Storage Apparatus D. Subsequently, in accordance with the same procedure, the block data groups are stored into Storage Apparatus A, Storage Apparatus B, Storage Apparatus C, and Storage Apparatus D in the stated order.

When an offset from the head of the file 181 becomes clear, it is possible to identify the block number and the storage apparatus 105 that stores the block data corresponding to the block number.

Figure 19:
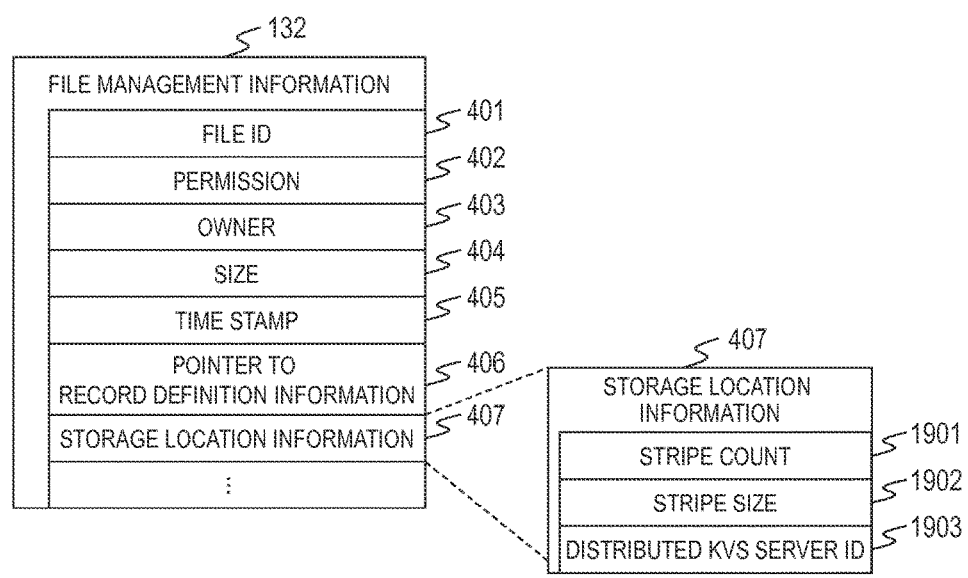
FIG. 19 is an explanatory diagram for showing an example of the file management information according to the second embodiment of this invention.

FIG. 19 is an explanatory diagram for showing an example of the file management information 132 according to the second embodiment of this invention.

In the second embodiment, one file 181 is stored in a plurality of storage apparatus 105 as a plurality of subfiles 1811, and hence the storage location information 407 of the file management information 132 stores information relating to a storage location of the subfile 1811.

The storage location information 407 is information for managing a structure of the subfile 1811, and includes a stripe count 1901, a stripe size 1902, and a distributed KVS server ID 1903.

The stripe count 1901 represents the number of subfiles 1811 by which one file 181 is distributively arranged. The stripe size 1902 represents a size (block count) of the block data group.

The distributed KVS server ID 1903 stores the identification information on the distributed KVS server 102 that manages the subfile 1811. In this embodiment, it is assumed that the subfile 1811 is assigned the identification number in order from "1". In this case, the distributed KVS server ID 1903 stores, for example, the identification number of the subfile 1811 and the identification information on the distributed KVS server 102 that manages the subfile 1811 in association with each other.

The second embodiment is different from the first embodiment in that the file ID 802 of the file arrangement information 152 stores the identification number of the subfile 1811. The KV data structure information 153 according to the second embodiment is the same as that of the first embodiment.

In the first embodiment, one file 181 is stored in one storage apparatus 105, and hence one loader 143 executes the loading processing. However, in the second embodiment, the plurality of subfiles 1811 generated from one file 181 are stored in the plurality of storage apparatus 105. Therefore, the loaders 143 on the respective distributed KVS servers 102 execute the loading processing in parallel. Accordingly, in the second embodiment, in a case where the KV data 171 is arranged in the cache area 161, processing for determining the distributed KVS server 102 to execute the loading processing is executed.

Figure 20:
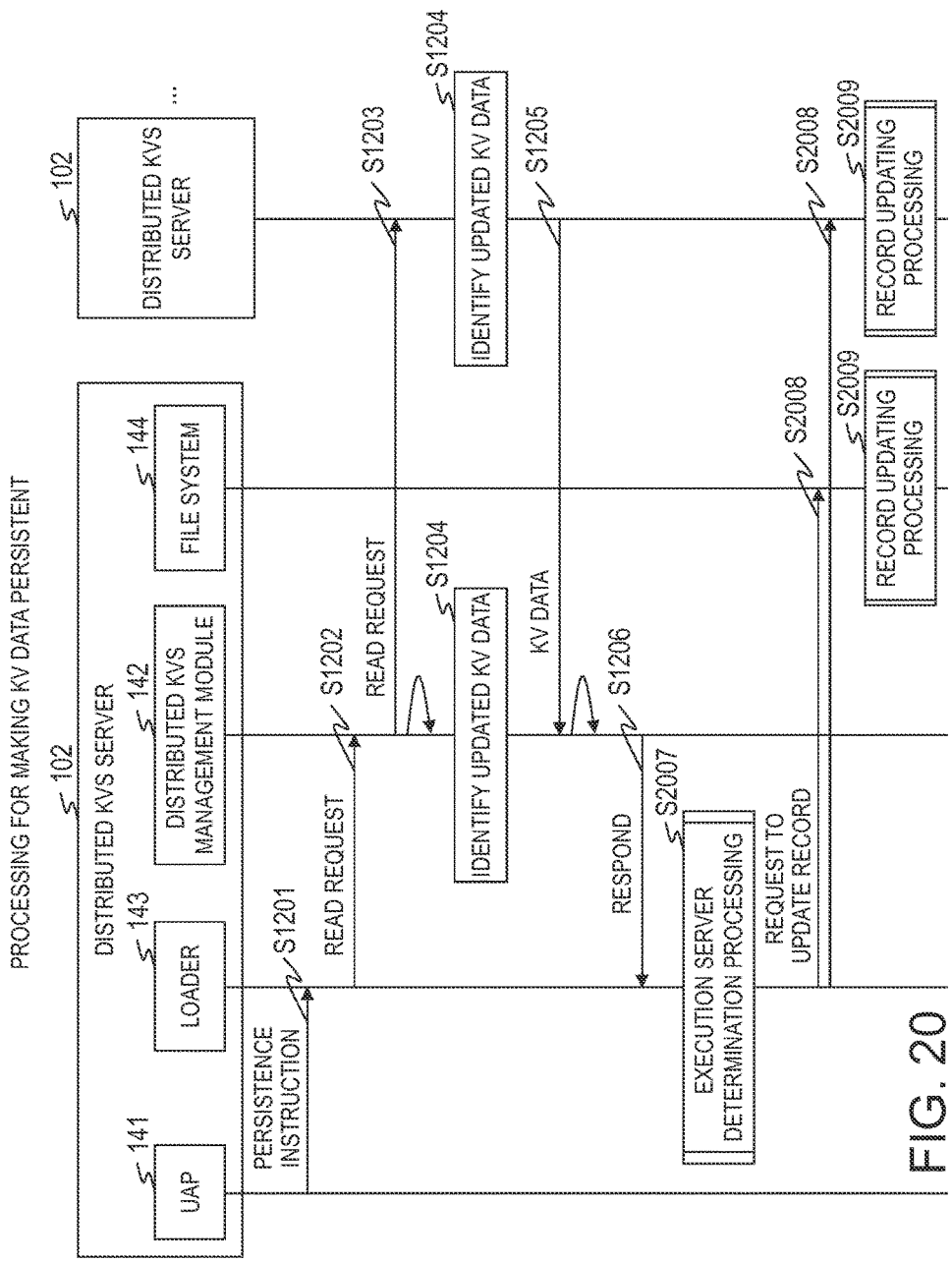
FIG. 20 is a sequence diagram for illustrating a flow of processing for making KV data persistent according to the second embodiment of this invention.

FIG. 20 is a sequence diagram for illustrating a flow of processing for making KV data persistent according to the second embodiment of this invention.

The processing of Step S1201 to Step S1206 is the same as the processing illustrated in FIG. 12.

The master loader 143 executes execution server determination processing (Step S2007). In the execution server determination processing according to the second embodiment, the plurality of subfiles 1811 in which the updated KV data 171 is to be reflected are identified, and the distributed KVS server 102 that manages each of the plurality of subfiles 1811 is determined as the execution server. In the second embodiment, the plurality of distributed KVS servers 102 are determined as the execution servers. The execution server determination processing according to the second embodiment is described later in detail with reference to FIG. 21.

The master loader 143 transmits a request to update a record to the plurality of distributed KVS servers 102 determined by an execution result of the execution server determination processing (Step S2008). The request to update the record includes the identification information on the subfile 1811 and the extracted KV data 171.

In a case of transmitting the request to update the record to the distributed KVS server 102 itself including the master loader 143, the master loader 143 transmits the request to update the record to the master file system 144. On the other hand, in a case of transmitting the request to update the record to another distributed KVS server 102, the master loader 143 transmits the request to update the record to the slave loader 143 of the another distributed KVS server 102. The slave loader 143 transmits the request to update the record to the slave file system 144.

In a case of receiving the request to update the record, the file system 144 executes record updating processing in order to reflect the updated KV data 171 in the file 181 (Step S2009). The record updating processing according to the second embodiment is described later in detail with reference to FIG. 24.

After the record updating processing ends, the file system 144 may notify the master loader 143 that the processing has been completed. In this case, the master loader 143 notifies the UAP 141 that the processing has ended normally.

Figure 21:
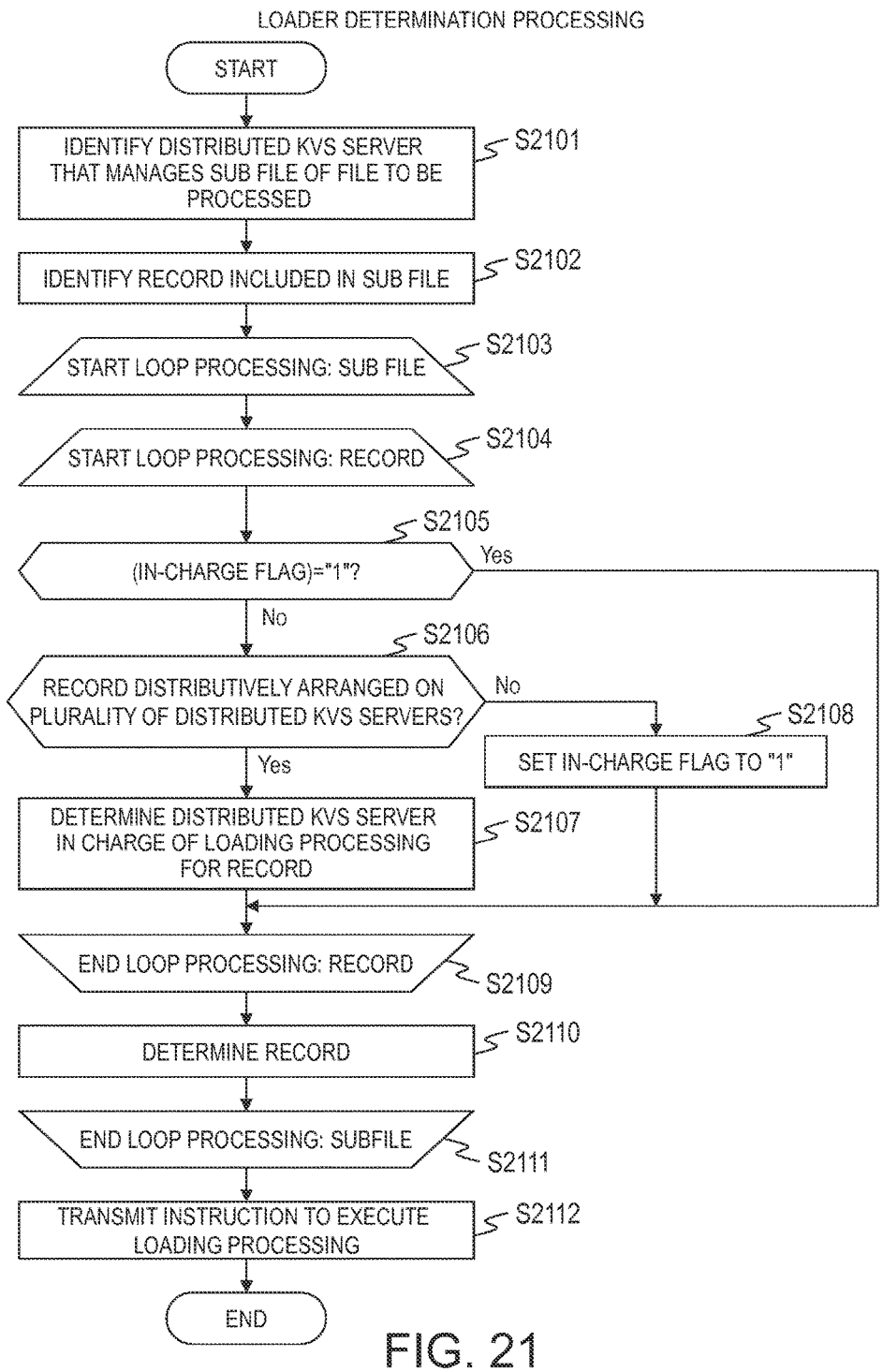
FIG. 21 is a flowchart for illustrating an example of loader determination processing according to the second embodiment of this invention.

FIG. 21 is a flowchart for illustrating an example of loader determination processing according to the second embodiment of this invention. FIG. 22 is an explanatory diagram for showing an example of a temporary list according to the second embodiment of this invention.

The loader 143 starts the loader determination processing described below in a case of receiving a loading instruction from the UAP 141 to load an arbitrary file 181 into the cache area 161. The loading instruction includes the identification information (file ID) on the file 181 to be processed and information on the field to be used as the key of the KV data 171. Further, the loading instruction includes the identification information (cache area ID) on the cache area 161 in which the KV data 171 is to be arranged.

The loader 143 identifies the distributed KVS server 102 that manages the subfile 1811 of the file 181 to be processed (Step S2101). Specifically, the following processing is executed.

The loader 143 instructs the file system 144 to open the file to be processed. The file system 144 returns the file management information 132 and the record definition information 133 along with the return value in response to the file opening. It should be noted that the processing executed by the file system 144 is the same as the processing of Step S1001, and hence a description thereof is omitted.

The loader 143 refers to the storage location information 407 of the file management information 132 to identify the distributed KVS server 102 that manages the subfile 1811. In this embodiment, the above-mentioned distributed KVS server 102 can be identified based on the distributed KVS server ID 1903 of the storage location information 407.

In this embodiment, the identified plurality of distributed KVS servers 102 are instructed to execute the loading processing. At this time, the loader 143 generates a temporary list 2200 shown in FIG. 22. Now, the temporary list 2200 is described.

The temporary list 2200 includes a subfile ID 2201, a distributed KVS server ID 2202, a record ID 2203, and an in-charge flag 2204.

The subfile ID 2201 stores the identification number of the subfile 1811. The distributed KVS server ID 2202 stores the identification information on the distributed KVS server 102 that manages the subfile 1811. The record ID 2203 represents the identification information on the record included in the subfile 1811. The in-charge flag 2204 stores information indicating whether or not the distributed KVS server 102 is in charge of the loading processing for the record. For example, the in-charge flag 2204 stores "1" to indicate that the distributed KVS server 102 is in charge of the loading processing for the record, while the in-charge flag 2204 stores "0" to indicate that the distributed KVS server 102 is not in charge of the loading processing for the record.

In Step S2101, the loader 143 generates entries the number of which corresponds to the number of subfiles 1811 in the temporary list 2200, and sets the identification number of the subfile 1811 in the subfile ID 2201 of the generated entry. Further, the loader 143 sets the identification information on the identified distributed KVS server 102 in the distributed KVS server ID 2202 of the generated entry. At this time point, the record ID 2203 and the in-charge flag 2204 are kept blank. The processing of Step S2101 is executed as described above.

In this embodiment, it is probable that the data on one record is included in a plurality of pieces of block data. Therefore, it is necessary to determine which distributed KVS server 102 is in charge of the loading processing for the record. Accordingly, the processing of Step S2103 to Step S2110 is executed.

First, the loader 143 identifies the record included in each subfile 1811 (Step S2102). Specifically, the loader 143 refers to the record definition information 133 and the storage location information 407 to calculate the record included in each subfile 1811. For example, the following processing is conceivable.

The loader 143 selects one subfile 1811. The loader 143 grasps the length of the record based on the record structure 501 of the record definition information 133. Subsequently, the loader 143 identifies the block data group included in the subfile 1811 based on the stripe count 1901 and the stripe size 1902 of the storage location information 407. In addition, the loader 143 identifies the record included in the subfile 1811 from the length of the record, the stripe count, and the stripe size.

The loader 143 sets the identification information on the identified record in the record ID 2203 of the entry within the temporary list 2200 corresponding to the selected subfile 1811, and also sets the in-charge flag 2204 to "0".

The loader 143 repeatedly executes the above-mentioned processing for every subfile 1811. The processing of Step S2102 is executed as described above.

Subsequently, the loader 143 starts loop processing for the subfile 1811 (Step S2103). Specifically, the loader 143 selects one subfile 1811 to be processed from the temporary list 2200. In this case, it is assumed that the subfile 1811 is selected in order of the identification number of the subfile 1811.

The loader 143 starts the loop processing for the record included in the selected subfile 1811 (Step S2104). Specifically, the loader 143 selects one record to be processed from among the records indicated by the record IDs 2203 of the entry within the temporary list 2200 corresponding to the selected subfile 1811.

The loader 143 determines whether or not the in-charge flag 2204 of the selected record is "1" (Step S2105). In other words, the loader 143 determines whether or not the distributed KVS server 102 corresponding to the distributed KVS server ID 2202 of the entry selected in Step S2103 has been determined to be in charge of the loading processing for the record.

In a case of determining that the in-charge flag 2204 of the selected record is "1", the loader 143 advances to Step S2109.

In a case of determining that the in-charge flag 2204 of the selected record is not "1", the loader 143 determines whether or not the data on the record is distributively arranged on the plurality of distributed KVS servers 102 (Step S2106). Specifically, the loader 143 refers to the record ID 2203 of the entry of another subfile 1811 within the temporary list 2200 to determine whether or not the same identification information as the identification information on the selected record exists. In a case where the same identification information as the identification information on the selected record exists in the record ID 2203 of the entry of the another subfile 1811, the loader 143 determines that the data on the record is distributively arranged on the plurality of distributed KVS servers 102.

In a case of determining that the data on the selected record is not distributively arranged on the plurality of distributed KVS servers 102, the loader 143 sets the in-charge flag 2204 of the record to "1" (Step S2108), and advances to Step S2109.

In a case of determining that the selected record is distributively arranged on the plurality of distributed KVS servers 102, the loader 143 determines the distributed KVS server 102 in charge of the loading processing for the record (Step S2107). After that, the loader 143 advances to Step S2109.

For example, it is conceivable to employ a method of determining, by the loader 143, the distributed KVS server 102 that manages the subfile 1811 including data at the head of the record as the distributed KVS server 102 in charge of the loading processing for the record. Further, it is conceivable to employ a method of determining the distributed KVS server 102 that manages the subfile 1811 including the largest part of the data on the record with respect to a total data amount of the record as the distributed KVS server 102 in charge of the loading processing for the record. It should be noted that this invention is not limited to any particular method of determining the distributed KVS server 102 in charge of the loading processing for the record.

In a case where the distributed KVS server 102 in charge of the loading processing for the selected record is the distributed KVS server 102 that manages the selected subfile 1811, the loader 143 sets the in-charge flag 2204 of the selected record to "1". Further, the loader 143 deletes the identification information on the record from the entry of another subfile 1811.

In a case where the distributed KVS server 102 in charge of the loading processing for the selected record is a distributed KVS server 102 different from the distributed KVS server 102 that manages the selected subfile 1811, the loader 143 sets the in-charge flag 2204 of the record of the entry corresponding to the subfile 1811 managed by another distributed KVS server 102 to "1". Further, the loader 143 deletes the identification information on the record from the entry of the another subfile 1811. The processing of Step S2107 is exemplified above.

Subsequently, the loader 143 determines whether or not the processing has been completed for all the records included in the selected subfile 1811 (Step S2109). Specifically, the loader 143 refers to the temporary list 2200 to determine whether or not there exists a record in which the in-charge flag 2204 of the entry of the selected subfile 1811 is "0". In a case where the record having the in-charge flag 2204 of "0" exists, the loader 143 determines that the processing has not been completed for all the records.

In a case of determining that the processing has not been completed for all the records included in the selected subfile 1811, the loader 143 returns to Step S2104 to execute the same processing.

In a case of determining that the processing has been completed for all the records included in the selected subfile 1811, the loader 143 determines the record (range of the record) of which the distributed KVS server 102 that manages the selected subfile 1811 is in charge (Step S2110). Specifically, the loader 143 refers to the entry of the temporary list 2200 corresponding to the selected subfile 1811 to determine the record registered in the record ID 2203 of the entry as the record of which the distributed KVS server 102 is in charge.

The loader 143 determines whether or not the processing has been completed for all the subfiles 1811 (Step S2111). In a case of determining that the processing has not been completed for all the subfiles 1811, the loader 143 returns to Step S2003 to execute the same processing.

In a case of determining that the processing has been completed for all the subfiles 1811, the loader 143 transmits an instruction to execute the loading processing to the distributed KVS server 102 that manages the subfile 1811 (Step S2112).

The instruction to execute the loading processing includes the identification number of the subfile 1811 and the identification information (range information) on the record of which the distributed KVS server 102 is in charge. In a case of receiving the instruction to execute the loading processing, the loader 143 of the distributed KVS server 102 executes the loading processing illustrated in FIG. 10. It should be noted that, in a case where the subfile 1811 includes data on the distributively arranged record in Step S1002, the loader 143 requests the distributed KVS server 102 that manages another subfile 1811 including the data on the distributively arranged record to read the data on the record. The other processing is the same as that of the first embodiment, and hence a description thereof is omitted.

The KV data updating processing is the same as that of the first embodiment, and hence a description thereof is omitted.

Figure 23:
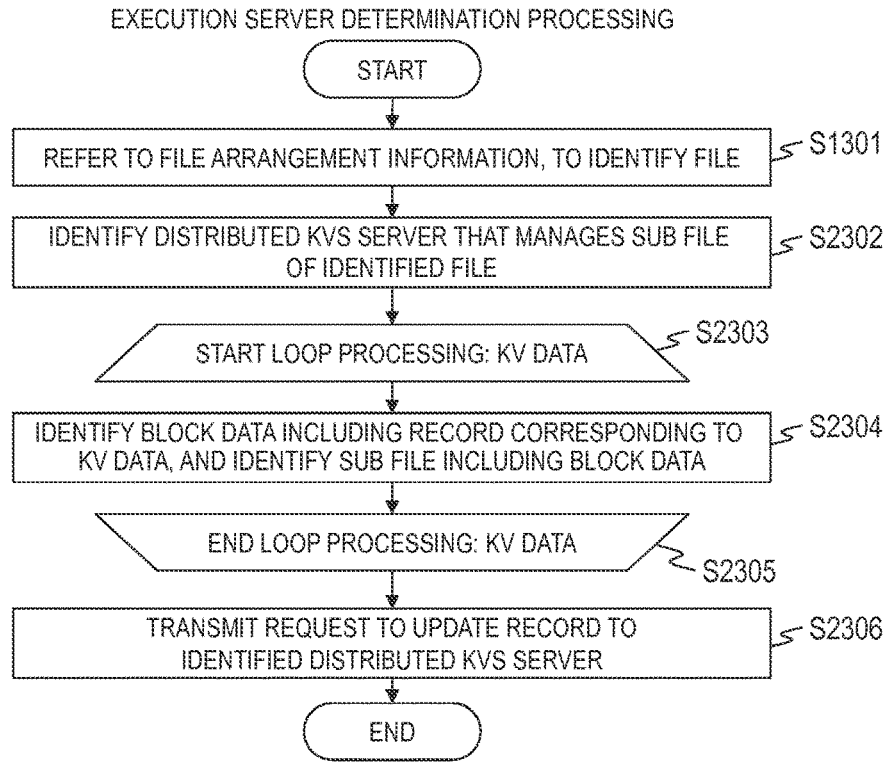
FIG. 23 is a flowchart for illustrating an example of the execution server determination processing according to the second embodiment of this invention.

FIG. 23 is a flowchart for illustrating an example of the execution server determination processing according to the second embodiment of this invention.

The processing of Step S1301 is the same as the processing illustrated in FIG. 13 (Step S1301). The master loader 143 refers to the storage location information 407 of the file management information 132 to identify the distributed KVS server 102 that manages the subfile 1811 generated from the file 181 to be processed (Step S2302).

The master loader 143 starts the loop processing for the KV data 171 (Step S2303). Specifically, the master loader 143 selects a piece of KV data 171 to be processed from among the plurality of pieces of updated KV data 171.

The master loader 143 refers to the KV data structure information 153 and the storage location information 407 of the file management information 132, to identify the subfile 1811 including the data on the record corresponding to the selected KV data 171 (Step S2304). Specifically, the following processing is executed.

The master loader 143 obtains the value size 903 and the offset 904 of the entry of the KV data structure information 153 corresponding to the selected KV data 171.

Based on the offset 904, the master loader 143 identifies the number of the block data including the data at the head of the record corresponding to the selected KV data 171. For example, the master loader 143 calculates the number of the block data including the data on the record by dividing the value of the offset 904 by the size of the block data.

In addition, the master loader 143 determines whether or not the block data identified based on the values size 903 includes all pieces of data on the record corresponding to the selected KV data 171.

In a case where the identified block data includes all the pieces of data on the record corresponding to the selected KV data 171, the number of the block data is output as a processing result. On the other hand, in a case where the identified block data does not include all the pieces of data on the record corresponding to the selected KV data 171, the master loader 143 identifies the number of the block data including the data on the record based on the value size 903.

Based on the stripe count 1901 and the stripe size 1902 of the storage location information 407, the master loader 143 identifies which block data group includes the identified number of the block data, and also identifies the subfile 1811 including the block data group.

At this time, the master loader 143 generates a list in which the key of the KV data 171 and the identification information on the distributed KVS server 102 that manages the identified subfile 1811 are associated with each other. The processing of Step S2304 is executed as described above.

Subsequently, the master loader 143 determines whether or not the processing has been completed for all the plurality of pieces of KV data 171 (Step S2305). In a case of determining that the processing has not been completed for all the plurality of pieces of KV data 171, the master loader 143 returns to Step S2303 to execute the same processing.

In a case of determining that the processing has been completed for all the plurality of pieces of KV data 171, the master loader 143 transmits the request to update the record to each of the identified distributed KVS servers 102 (Step S2306), and brings the processing to an end. Specifically, the following processing is executed.

The master loader 143 selects the subfile 1811 to be processed. The master loader 143 refers to the list generated in Step S2304 to extract the KV data 171 to be transmitted to the distributed KVS server 102 that manages the selected subfile 1811.

The master loader 143 transmits the request to update the record including the identification information on the subfile 1811 to be processed and the extracted KV data 171 to the distributed KVS server 102 that manages the selected subfile 1811. The processing of Step S2306 is executed as described above.

Figure 24:
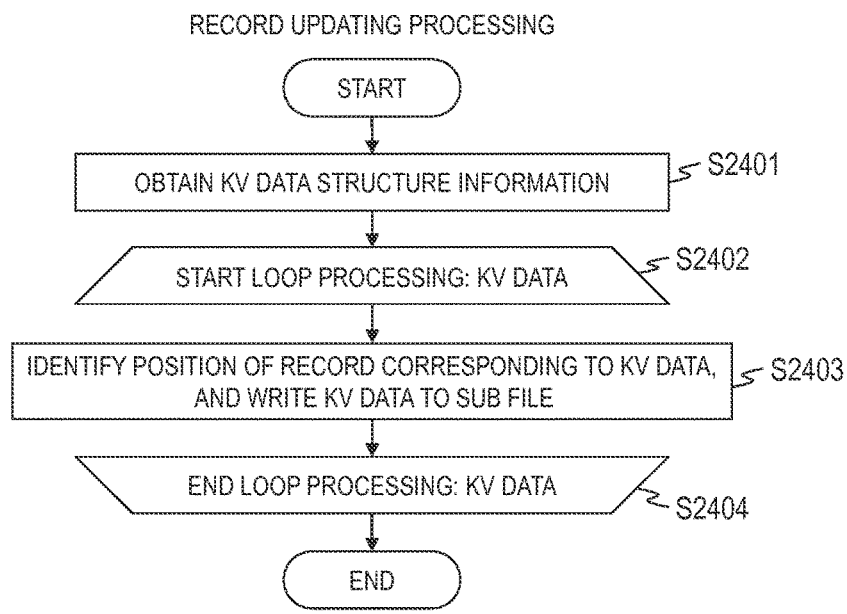
FIG. 24 is a flowchart for illustrating an example of the record updating processing according to the second embodiment of this invention.

FIG. 24 is a flowchart for illustrating an example of the record updating processing according to the second embodiment of this invention.

In a case of receiving the request to update the record, the file system 144 starts the record updating processing. First, the file system 144 obtains the KV data structure information 153 corresponding to the subfile 1811 to be processed (Step S2401). As the processing of Step S2401, the same processing as that of Step S1401 is used.

The file system 144 starts loop processing for the KV data 171 (Step S2402). The file system 144 selects a piece of KV data 171 included in the request to update the record.

The file system 144 identifies the position of the record corresponding to the KV data 171 within the subfile 1811 to be processed, and writes the KV data 171 in the identified position (Step S2403). Specifically, the following processing is executed.

The file system 144 refers to the obtained KV data structure information 153 to retrieve the entry having the key 902 matching the key 302 of the piece of selected KV data 171. The file system 144 identifies the number of the block data including the data at the head of the record corresponding to the selected KV data 171 based on the offset 904 of the retrieved entry. In addition, the file system 144 identifies the data on the record included in the block data identified based on the value size 903. With this configuration, it is possible to identify the position of the KV data 171 and the data to be written.

The file system 144 overwrites the identified amount of the KV data 171 in the identified position, to thereby reflect the updated KV data 171 in the file 181 to be processed. The processing of Step S2403 is executed as described above.

Subsequently, the file system 144 determines whether or not the processing has been completed for all the plurality of pieces of KV data 171 included in the request to update the record (Step S2404).

In a case of determining that the processing has not been completed for all the plurality of pieces of KV data 171, the file system 144 returns to Step S2402 to execute the same processing. In a case of determining that the processing has been completed for all the plurality of pieces of KV data 171, the file system 144 brings the processing to an end.

According to the second embodiment, even when the data on the file is distributively arranged on a plurality of servers as the subfiles 1811, the result of updating or deleting the KV data 171 can be reflected in the subfile 1811. With this configuration, the distributed file system and the distributed KVS can cooperate with each other, and it is possible to access data having the same contents by using any one of the file I/O API and the KV data API. Further, in a case where the updated KV data 171 is reflected in the subfile 1811, the record of which each distributed KVS server 102 is in charge is determined, and hence it is possible to suppress an increase in communication amount between servers, which can realize high speed data transfer between the distributed KVS and the distributed file system.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer system, comprising a plurality of computers coupled to one another through a network,
    each of the plurality of computers including:
    a processor;
    a memory coupled to the processor; and
    a network interface coupled to the processor,
    the each of the plurality of computers being coupled to a storage apparatus configured to store at least one file including a plurality of records,
    the each of the plurality of computers further including:
    a file system configured to manage the at least one file stored in the storage apparatus;
    a key-value data management module configured to generate at least one data storage area by integrating storage areas included in the plurality of computers, and manage key-value data arranged in the at least one data storage area; and
    a loader configured to generate a plurality of pieces of the key-value data by dividing the at least one file and associating a search key and a value indicating a content of one of the plurality of records in association with each other, and distributively store the plurality of pieces of the generated key-value data in the at least one data storage area,
    the each of the plurality of computers being configured to hold, for each the plurality of pieces of the key-value data, key-value data structure information in which the search key, a size of the value, and a position of one of the plurality of records corresponding to a piece of the key-value data within the at least one file are associated with one another,
    the loader being configured to transmit a read request for obtaining at least one piece of the updated key-value data to the key-value data management module of each of the plurality of computers, in a case of receiving a persistence instruction to instruct the loader to reflect the at least one piece of the updated key-value data in the at least one file;
    the key-value data management module being configured to:
    retrieve the at least one piece of the updated key-value data from among the plurality of pieces of the key-value data stored in the storage areas forming the at least one data storage area in a case of receiving the read request; and
    transmit the at least one piece of the updated key-value data to the loader that has transmitted the read request;
    the loader being configured to:
    identify a file to be processed in which the at least one piece of the updated key-value data is to be reflected based on the at least one piece of the updated key-value data obtained from the key-value data management module of the each of the plurality of computers;
    identify one of the plurality of computers coupled to the storage apparatus that stores the file to be processed; and
    transmit a request to update the file including the at least one piece of the updated key-value data to the identified one of the plurality of computers; and
    the file system being configured to:
    identify the position of one of the plurality of records corresponding to the piece of updated key-value data within the file based on the key-value data structure information in a case of receiving the request to update the file; and
    update the file by writing the at least one piece of the updated key-value data in the identified position of the file.

2. The computer system according to claim 1, wherein:
    the read request includes identification information on a data storage area to be processed;
    each of the plurality of computers is configured to hold key-value data management information for managing the key-value data stored in the data storage area, the key-value data management information including the identification information on the data storage area; and
    the key-value data management module is configured to:
    update the at least one piece of the key-value data stored in the storage areas forming the data storage area in a case of receiving a request to update the at least one piece of the key-value data;
    determine whether or not a dirty list has been generated, the dirty list is a list of the plurality of pieces of the updated key-value data;
    add the at least one piece of the newly updated key-value data to the dirty list in a case of determining that the dirty list has been generated;
    generate the dirty list and set a pointer to the generated dirty list in the key-value data management information in a case of determining that the dirty list has not been generated;
    retrieve the key-value data management information that matches the identification information on the data storage area included in the read request in a case of receiving the read request; and
    refer to the dirty list based on the pointer to the dirty list within the retrieved key-value data management information, to obtain the at least one piece of the updated key-value data from among the plurality of pieces of the key-value data stored in the data storage area to be processed.

3. The computer system according to claim 2, wherein:
    at least one of the pluralities of computers is configured to hold file management information for managing a structure of the file;
    the file management information includes identification information on the file and information on the storage apparatus that stores the file;

the each of the plurality of computers is configured to hold file arrangement information in which the identification information on the data storage area and the identification information on the file serving as a source data of the key-value data stored in the data storage area are associated with each other;

the persistence instruction includes the identification information on the data storage area to be processed; and the loader is configured to:

obtain the file management information after obtaining the at least one piece of the updated key-value data;

refer to the file arrangement information corresponding to the identification information on the data storage area to be processed, which is included in the persistence instruction, to identify the file to be processed;

obtain the file management information corresponding to the file to be processed; and refer to the file management information corresponding to the file to be processed, to identify the one of the plurality of computers coupled to the storage apparatus that stores the file to be processed.

4. The computer system according to claim 3, wherein:

the at least one of the pluralities of computers is configured to:

hold record definition information for defining a structure of each of the plurality of records within the file; and manage the file management information and the record definition information in association with each other; and the loader is configured to:

obtain the file management information and the record definition information in a case of receiving a loading instruction to instruct the loader to arrange a new file in the data storage area;

refer to the file management information to obtain the new file from one of the plurality of computers coupled to the storage apparatus that stores the new file;

generate the file arrangement information by associating the identification information on the data storage area and identification information on the new file with each other;

generate the plurality of pieces of the key-value data from each of the plurality of records included in the new file;

generate the key-value data structure information based on the record definition information by associating the search key of each of the plurality of records, the size of the value, and the position of one of the plurality of records within the file with one another;

transmit to each of a plurality of the key-value data management modules, an arrangement request for the plurality of pieces of the key-value data in a plurality of the data storage areas; and transmit the file arrangement information and the key-value data structure information to the plurality of computers.

5. The computer system according to claim 2, wherein:

the file stored in the storage apparatus includes a subfile obtained by dividing one source file;

at least one of the plurality of computers is configured to hold file management information for managing a structure of the subfile;

the file management information includes identification information on the subfile and identification information on the storage apparatus that stores the subfile;

the each of the plurality of computers is configured to hold file arrangement information in which the identification information on the data storage area and the identification information on the subfile serving as a source data of the key-value data stored in the data storage area are associated with each other;

the persistence instruction includes the identification information on the data storage area to be processed; and the loader is configured to:

obtain the file management information after obtaining the at least one piece of the updated key-value data;

refer to the file arrangement information based on the identification information on the data storage area to be processed, which is included in the persistence instruction, to identify the source file to be processed;

obtain the file management information corresponding to the source file to be processed; and refer to the file management information corresponding to the source file to be processed, to identify one of the plurality of computers coupled to the storage apparatus that stores the subfile corresponding to the source file to be processed.

6. The computer system according to claim 5, wherein:

the at least one of the plurality of computers is configured to:

hold record definition information for defining a structure of each of the plurality of records within the file; and manage the file management information and the record definition information in association with each other; and the loader is configured to:

obtain the file management information and the record definition information in a case of receiving a loading instruction to instruct the loader to arrange a new source file in the data storage area;

identify, based on the file management information, a plurality of the subfiles obtained by dividing the new source file;

identify, for each of the plurality of the subfiles, one of the plurality of computers coupled to the storage apparatus that stores the subfile;

identify, for each of the plurality of the subfiles, one of the plurality of records included in the subfile, to thereby determine one of the plurality of records of which the one of the plurality of computers coupled to the storage apparatus that stores the subfile is in charge;

transmit a loading instruction to instruct the loader to arrange the subfile including information on the determined one of the plurality of records, to the one of the plurality of computers;

obtain the file management information and the record definition information in a case receiving the loading instruction;

refer to the file management information to obtain the subfile including the determined one of the plurality of records from the storage apparatus;

generate the file arrangement information by associating the identification information on the data storage area and the identification information on the subfile with each other;

generate the plurality of pieces of the key-value data from each of the plurality of records included in the subfile;

generate the key-value data structure information based on the record definition information by associating the search key of each of the plurality of records, the size of the value, and the position of one of the plurality of records within the file with one another;

transmit, to each of a plurality of the key-value data management modules, an arrangement request for the plurality of pieces of the key-value data in a plurality of the data storage areas; and transmit the file arrangement information and the key-value data structure information to the plurality of computers.

7. A data management method performed in a computer system, the computer system including a plurality of computers to be coupled to one another through a network, each of the plurality of computers including: a processor; a memory coupled to the processor; and a network interface coupled to the processor, the each of the plurality of computers being coupled to a storage apparatus configured to store at least one file including a plurality of records, the each of the plurality of computers further including:

a file system configured to manage the at least one file stored in the storage apparatus;

a key-value data management module configured to generate at least one data storage area by integrating storage areas included in the plurality of computers, and manage key-value data arranged in the at least one data storage area; and a loader configured to generate a plurality of pieces of the key-value data by dividing the at least one file and associating a search key and a value indicating a content of one of the plurality of records in association with each other, and distributes and store the plurality of pieces of the generated key-value data in the at least one data storage area, the each of the plurality of computers being configured to hold, for each of the plurality of pieces of the key-value data, key-value data structure information in which the search key, a size of the value, and a position of one of the plurality of records corresponding to a piece of key-value data within the at least one file are associated with one another, the data management method including:

a first step of transmitting, by the loader, a read request for obtaining at least one piece of the updated key-value data to the key-value data management module of each of the plurality of computers in a case of receiving a persistence instruction to instruct the loader to reflect the at least one piece of the updated key-value data in the at least one file;

a second step of retrieving, by the key-value data management module, the at least one piece of the updated key-value data from among the plurality of pieces of the key-value data pairs stored in the storage areas forming the at least one data storage area in a case of receiving the read request;

a third step of transmitting, by the key-value data management module, the at least one piece of the updated key-value data to the loader that has transmitted the read request;

a fourth step of identifying, by the loader, a file to be processed in which the at least one piece of the updated key-value data is to be reflected based on the at least one piece of the updated key-value data obtained from the key-value data management module of the each of the plurality of computers, to identify one of the plurality of computers coupled to the storage apparatus that stores the file to be processed;

a fifth step of transmitting, by the loader, a request to update the file including the at least one piece of the updated key-value data to the identified one of the plurality of computers;

a sixth step of identifying, by the file system the position of one of the plurality of records corresponding to the at least one piece of the updated key-value data within the file based on the key-value data structure information in a case of receiving the request to update the file; and a seventh step of updating, by the file system, the file by writing the at least one piece of the updated key-value data in the identified position of the file.

8. The data management method according to claim 7, wherein:

the read request includes identification information on a data storage area to be processed;

the each of the plurality of computers is configured to hold key-value data management information for managing the key-value data stored in the data storage area, the key-value data management information including the identification information on the data storage area;

the data management method further including:

a step of updating, by the key-value data management module the key-value data pair stored in the storage areas forming the data storage area in a case of receiving a request to update the at least one piece of the key-value data;

a step of determining, by the key-value data management module, whether or not a dirty list, which is a list of the plurality of pieces of the updated key-value data, has been generated;

a step of adding, by the key-value data management module, the at least one piece of the newly updated key-value data pair to the dirty list in a case of determining that the dirty list has been generated; and a step of generating, by the key-value data management module, the dirty list and setting a pointer to the generated dirty list in the key-value data management information in a case of determining that the dirty list has not been generated; and the second step includes:

a step of retrieving the key-value data management information that matches the identification information on the data storage area included in the read request; and a step of referring to the dirty list based on the pointer to the dirty list within the retrieved key-value data management information, to obtain the at least one piece of the updated key-value data from among the plurality of pieces of the key-value data stored in the data storage area to be processed.

9. The data management method according to claim 8, wherein:

at least of the plurality of one computers is configured to hold file management information for managing a structure of the file;

the file management information includes identification information on the file and information on the storage apparatus that stores the file;

the each of the plurality of computers is configured to hold file arrangement information in which the identification information on the data storage area and the identification information on the file serving as a source data of the key-value data stored in the data storage area are associated with each other;

the persistence instruction includes the identification information on the data storage area to be processed; and the fourth step includes:

a step of obtaining the file management information;

a step of referring to the file arrangement information corresponding to the identification information on the data storage area to be processed, which is included in the persistence instruction, to identify the file to be processed;

a step of obtaining the file management information corresponding to the file to be processed; and referring to the file management information corresponding to the file to be processed, to identify the one of the plurality of computers coupled to the storage apparatus that stores the file to be processed.

10. The data management method according to claim 9, wherein:

the at least one of the plurality of computers is configured to:

hold record definition information for defining a structure of each of the plurality of records within the file; and manage the file management information and the record definition information in association with each other; and the data management method further includes:

a step of obtaining, by the loader, the file management information and the record definition information in a case of receiving a loading instruction to instruct the loader to arrange a new file in the data storage area;

a step of referring, by the loader, to the file management information to obtain the new file from one of the plurality of computers coupled to the storage apparatus that stores the new file;

a step of generating, by the loader, the file arrangement information by associating the identification information on the data storage area and identification information on the new file with each other;

a step of generating, by the loader, the plurality of pieces of the key-value data from each of the plurality of records included in the new file;

a step of generating, by the loader, the key-value data structure information based on the record definition information by associating the search key of each of the plurality of records, the size of the value, and the position of one of the plurality of records within the file with one another;

a step of transmitting, by the loader, to each of a plurality of the key-value data management modules, an arrangement request for the plurality of pieces of the key-value data in a plurality of the data storage areas; and a step of transmitting, by the loader, the file arrangement information and the key-value data structure information to the plurality of computers.

11. The data management method according to claim 8, wherein:

the file stored in the storage apparatus includes a subfile obtained by dividing one source file;

at least one of the plurality of computers is configured to hold file management information for managing a structure of the subfile;

the file management information includes identification information on the subfile and identification information on the storage apparatus that stores the subfile;

the each of the plurality of computers is configured to hold file arrangement information in which the identification information on the data storage area and the identification information on the subfile serving as a source data of the key-value data stored in the data storage area are associated with each other;

the persistence instruction includes the identification information on the data storage area to be processed; and the fourth step includes:

a step of obtaining the file management information after obtaining the at least one piece of the updated key-value data;

a step of referring to the file arrangement information based on the identification information on the data storage area to be processed, which is included in the persistence instruction, to identify the source file to be processed;

a step of obtaining the file management information corresponding to the source file to be processed; and a step of referring to the file management information corresponding to the source file to be processed, to identify one of the plurality of computers coupled to the storage apparatus that stores the subfile corresponding to the source file to be processed.

12. The data management method according to claim 11, wherein:

the at least one of the plurality of computers is configured to:

hold record definition information for defining a structure of each of the plurality of records within the file; and manage the file management information and the record definition information in association with each other; and the data management method further includes:

a step of obtaining, by the loader, the file management information and the record definition information in a case of receiving a loading instruction to instruct the loader to arrange a new source file in the data storage area;

a step of identifying, by the loader, based on the file management information, a plurality of the subfiles obtained by dividing the new source file;

a step of identifying, by the loader, for each of the plurality of the subfiles, one of the plurality of computers coupled to the storage apparatus that stores the subfile;

a step of identifying, by the loader, for each of the plurality of the subfiles, one of the plurality of records included in the subfile, to thereby determine one of the plurality of records of which the one of the plurality of computers coupled to the storage apparatus that stores the subfile is in charge;

a step of transmitting, by the loader, a loading instruction to instruct the loader to arrange the subfile including information on the determined one of the plurality of records, to the one of the plurality of computers;

a step of obtaining, by the loader, the file management information and the record definition information in a case of receiving the loading instruction;

a step of referring, by the loader, to the file management information to obtain the subfile including the determined one of the plurality of records from the storage apparatus;

a step of generating, by the loader, the file arrangement information by associating the identification information on the data storage area and the identification information on the subfile with each other;

a step of generating, by the loader, the plurality of pieces of the key-value data from each of the plurality of records included in the subfile;

a step of generating, by the loader, the key-value data structure information based on the record definition information by associating the search key of each of the plurality of records, the size of the value, and the position of one of the plurality of records within the file with one another;

a step of transmitting, by the loader, to each of a plurality of the key-value data management modules, an arrangement request for the plurality of pieces of the key-value data in a plurality of the data storage areas; and transmitting, by the loader, the file arrangement information and the key-value data structure information to the plurality of computers.

* * * * *